United States Patent [19]
Roberts et al.

[11] Patent Number: 5,361,190
[45] Date of Patent: *Nov. 1, 1994

[54] MIRROR ASSEMBLY

[75] Inventors: John K. Roberts; Keith R. Spencer, both of Sheboygan, Wis.

[73] Assignee: K. W. Muth Co. Inc., Sheboygan, Wis.

[*] Notice: The portion of the term of this patent subsequent to May 7, 2008 has been disclaimed.

[21] Appl. No.: 985,133

[22] Filed: Dec. 2, 1992

Related U.S. Application Data

[63] Continuation-in-part of Ser. No. 694,884, May 2, 1991, Pat. No. 5,207,492, which is a continuation-in-part of Ser. No. 482,254, Feb. 20, 1990, Pat. No. 5,014,167.

[51] Int. Cl.$^5$ .......................... F21V 3/04; F21V 9/00
[52] U.S. Cl. ................................ 362/61; 362/83.1; 362/135; 362/276; 362/339; 362/331; 340/461; 340/469; 315/309; 315/77; 313/500; 250/214 AL
[58] Field of Search ............... 362/61, 80, 83.1, 135, 362/296, 290, 276, 339, 330, 26, 32, 331; 340/475, 468, 461, 469; 315/309, 77, 158, 156, 307; 313/500; 250/214 AL

[56] References Cited

U.S. PATENT DOCUMENTS

| | | |
|---|---|---|
| 2,060,401 | 11/1936 | Smith . |
| 2,190,123 | 2/1940 | Pace . |
| 2,263,382 | 11/1941 | Gotzinger . |
| 2,580,014 | 12/1951 | Gazda . |
| 2,595,331 | 5/1952 | Calihan et al. ............ 362/135 |
| 3,040,207 | 6/1962 | Grontkowski ............ 362/276 |
| 3,266,016 | 8/1966 | Maruyama et al. ......... 362/83.1 |
| 3,436,758 | 4/1969 | Kluth ................... 340/376 |
| 3,449,626 | 6/1969 | DeCastelet ............... 315/309 |
| 3,543,018 | 11/1970 | Barcus et al. . |
| 3,665,392 | 5/1972 | Annas ................... 340/67 |

(List continued on next page.)

OTHER PUBLICATIONS

Advertising Brochure of the Gentex Corporation and which is directed to a Gentex Electrochromic Headlamp Control Mirror (2).
Catalog of OCLI entitled "Stock Filter Catalog 1989" and which relates to Color Separation Filters manufactured by OCLI.
Advertising Brochure, 3M Company directed to their product called a Light Control Film.
Extract of the New Lexicon Webster's Dictionary of English Language–Definition of "Dichroic".
Advertising Brochure related to MLZ1-RN model LEDs, manufactured by Mitsubishi Cable Industries Ltd.
Advertising Brochure Including a photograph entitled "MR STM" from Muth Advanced Technologies.
Technical Sheet entitled "High Power T-1 ¾ (5 mm) Ts AlGaAs Red Lamps" and which are manufactured by Hewlett-Packard.

Primary Examiner—Ira S. Lazarus
Assistant Examiner—L. Heyman
Attorney, Agent, or Firm—Godfrey & Kahn

[57] ABSTRACT

A mirror assembly is disclosed which includes a dichroic mirror which allows a predetermined narrow spectral band to pass through the mirror and be seen from a position forward of the mirror, and which further reflects a broad spectral band of light which originates from a direction forward of the mirror; a light source is positioned rearwardly of the mirror and emits light in the predetermined narrow spectral band passed by the dichroic mirror; and an electronic circuit is provided which is operable to step up, or step down the voltage supplied to the light source thereby maintaining a constant voltage source which is utilized to energize the light source.

20 Claims, 18 Drawing Sheets

U.S. PATENT DOCUMENTS

| | | | |
|---|---|---|---|
| 3,840,851 | 10/1974 | Fowler et al. | 340/74 |
| 4,040,726 | 8/1977 | Paca . | |
| 4,499,451 | 2/1985 | Suzuki et al. | 340/98 |
| 4,506,315 | 3/1985 | Maekawa et al. | 362/83 |
| 4,516,197 | 5/1985 | Yonkers | 362/342 |
| 4,588,267 | 5/1986 | Pastore . | |
| 4,613,791 | 9/1986 | Kurihara et al. | 315/82 |
| 4,626,967 | 12/1986 | Segoshi | 362/61 |
| 4,630,904 | 12/1986 | Pastore . | |
| 4,646,210 | 2/1987 | Skogler et al. | 362/142 |
| 4,659,967 | 4/1987 | Dahl | 315/307 |
| 4,665,321 | 5/1987 | Chang et al. | 315/159 |
| 4,733,336 | 3/1988 | Skogler et al. | 362/142 |
| 4,791,534 | 12/1988 | Lindberg | 362/80 |
| 4,793,690 | 12/1988 | Gahan . | |
| 4,799,768 | 1/1989 | Gahan . | |
| 4,807,096 | 2/1989 | Skogler et al. | 362/142 |
| 4,841,198 | 6/1989 | Wilhelm | 315/307 |
| 4,868,459 | 9/1989 | Dennerlein et al. | 315/77 |
| 4,882,565 | 11/1989 | Gallmeyer | 340/461 |
| 4,886,960 | 12/1989 | Molyneux et al. | 250/209 |
| 4,893,063 | 1/1990 | Pernyeszi | 315/307 |
| 4,917,477 | 4/1990 | Bechtel et al. . | |
| 4,935,665 | 1/1990 | Murata | 362/800 |
| 5,014,167 | 2/1990 | Roberts | 362/83.1 |
| 5,174,649 | 12/1992 | Alston | 362/800 |

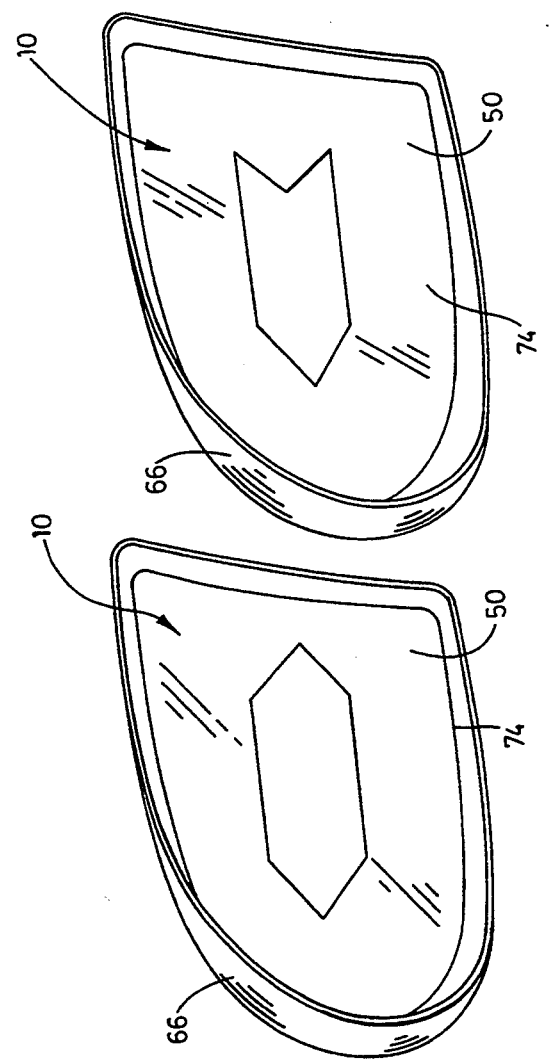

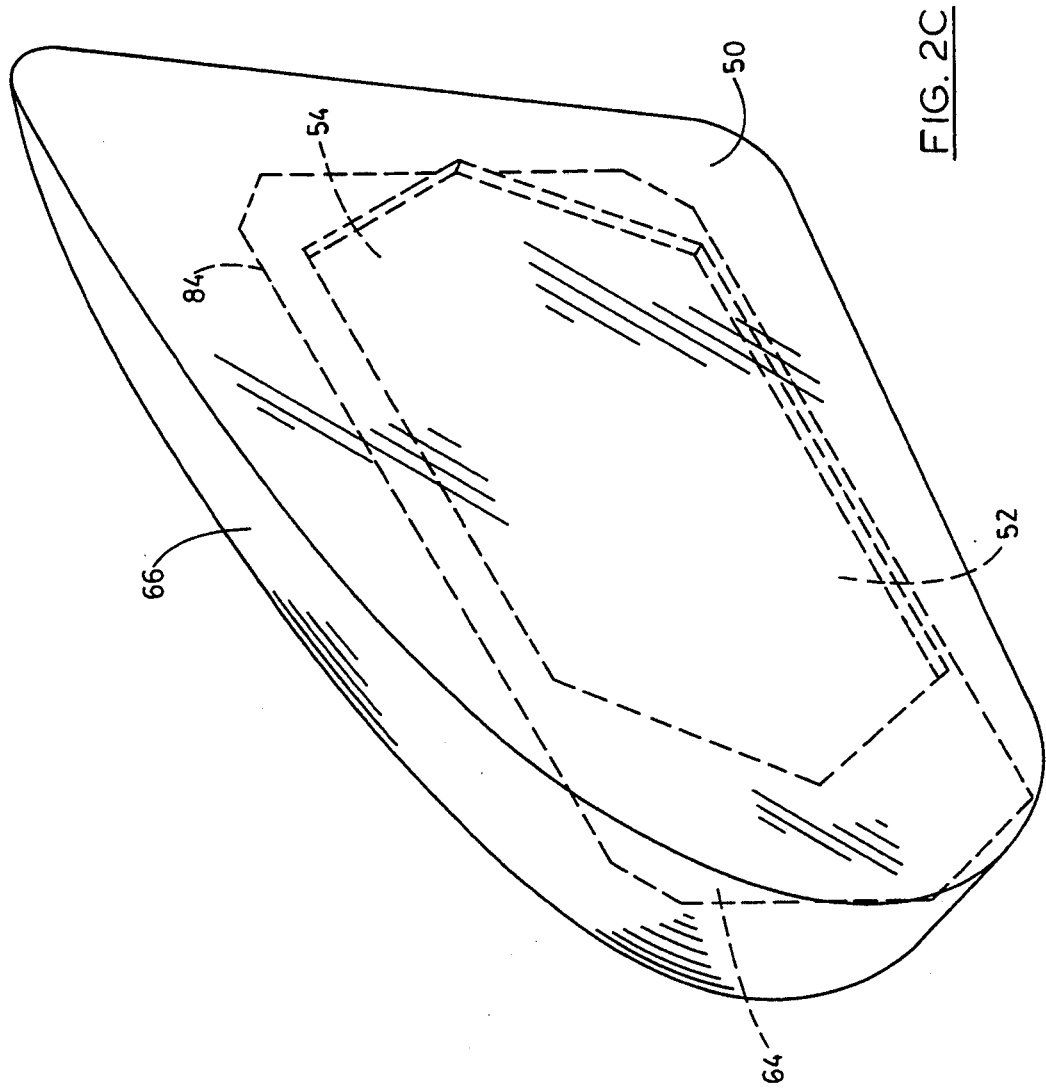

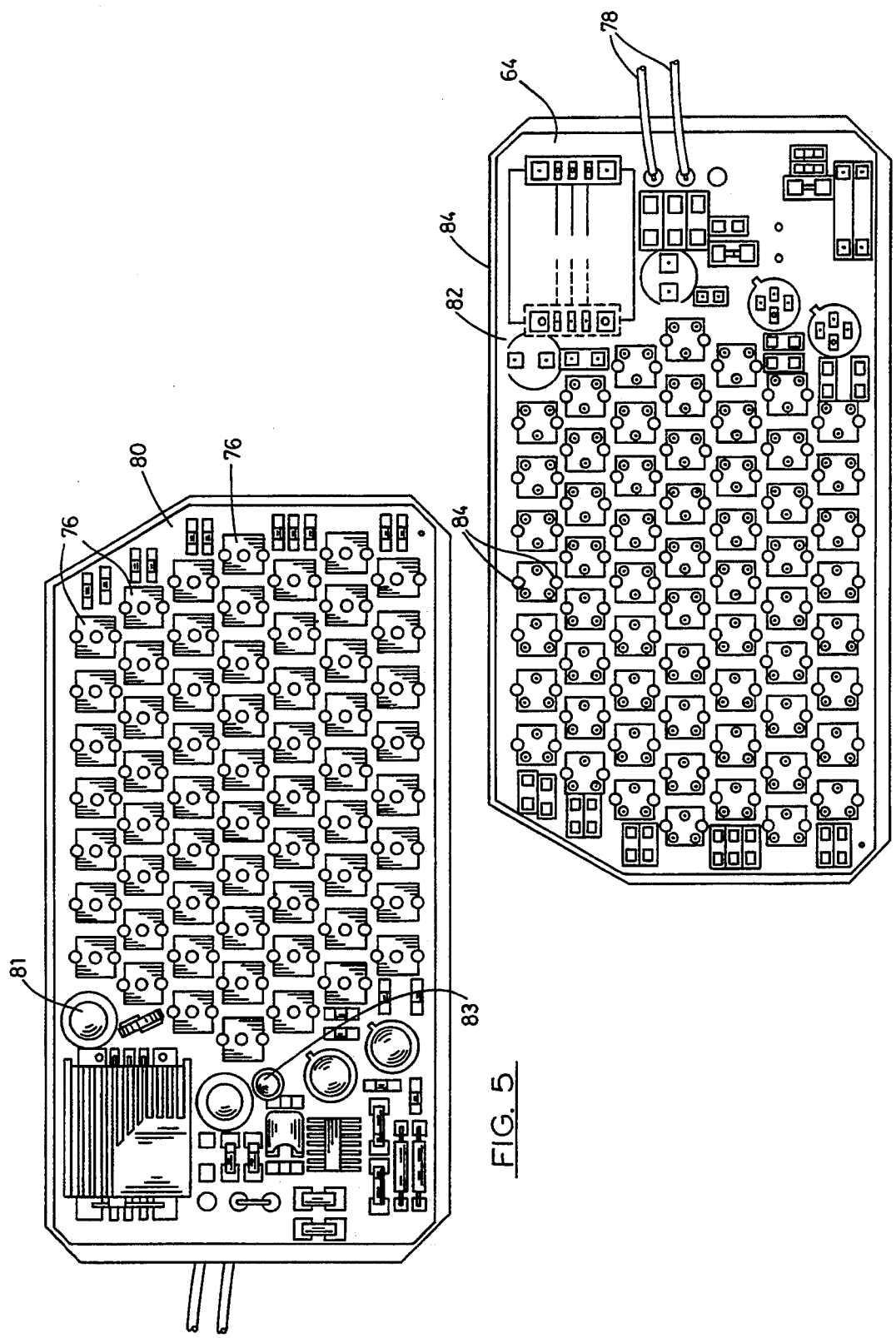

MIRROR ASSEMBLY

CROSS REFERENCES TO RELATED APPLICATIONS

This patent application is a continuation-in-part of U.S. patent application Ser. No. 07/694,884, filed on May 2, 1991, now issued as U.S. Pat. No. 5,207,492, and which is a continuation-in-part of U.S. patent application Ser. No. 07/482,254, filed on Feb. 20, 1990, now issued as U.S. Pat. No. 5,014,167.

1. Field of the Invention

The present invention relates to a mirror assembly having a wide variety of uses, but which has particular utility when mounted on, and electrically coupled with, the controls of an overland vehicle and the like; the invention including a combination mirror assembly and signaling apparatus which may operate as an auxiliary brake lamp or turn signal in overland vehicles such as passenger automobiles, light trucks or the like.

2. Description of the Prior Art

The beneficial effects of employing auxiliary, or so-called "third" brake lamps has been known for some time. For example, studies suggest that overland vehicles equipped with auxiliary brake lamps which are located in particular positions may be less likely to become involved in rear-end collisions. Similar benefits are likely to stem from the use of auxiliary turn lamps. More particularly, federal law mandates that new automobiles and light trucks or utility vehicles include an auxiliary or third brake lamp which is mounted substantially along the longitudinal axis of same and oriented rearwardly of the passenger compartment. In most instances, the auxiliary brake lamps are positioned inside the passenger compartment and displayed in the rear windscreen thereof. These lamps are often referred to as a CHMSL (Center High-Mounted Stop Lamp). Occasionally, however, and due to design considerations, an auxiliary brake lamp may, alternatively, be mounted in a housing which is fixed to the trunk or the like. Such an arrangement is used in the case of convertibles, for example.

While these auxiliary brake lamps generally operate in the manner intended, that is, to provide a visual signal when the brakes are applied, the means by which these auxiliary brake lamps have been mounted on overland vehicles, and more particularly passenger automobiles wherein the auxiliary brake lamps are mounted in the rear windscreen thereof, have generally been considered to detract from the stylish appearance of the most recently manufactured automobiles. Further, and when the auxiliary brake lamp is mounted in a position exterior to the passenger compartment, the auxiliary brake lamp and its associated exterior housing detracts from the surrounding design features of the automobile and which normally include smooth substantially continuous lines which tend to give the vehicle an overall aerodynamic appearance. Further, the housing of this assembly provides an obstruction to the rearward view of the operator, therefore presenting a safety hazard, and further causes more drag and often generates wind noise. In addition, these housings are prone to obstruction during periods of heavy snowfall, are not conspicuous from locations which are adjacent to and rearwardly of the overland vehicle, and are easily obscured by towed vehicles such as boat trailers, camper trailers, and the like.

In addition to the foregoing, a convenient means for mounting an auxiliary brake lamp on light trucks has not been developed. Moreover, and in overland vehicles such as tractor-trailer combinations, an auxiliary brake lamp has not been employed with same. However, operators of such vehicles have long recognized a need for additional brake lamps which could signal an operator of an adjoining vehicle, which may be following closely or passing, that the tractor-trailer is braking, turning or otherwise preparing to change lanes. This would be particularly helpful when the adjoining vehicle passing the tractor-trailer is positioned between the rear of the trailer and the towing tractor, respectively, and in an area which could be out of the view of the tractor-trailer operator as he employs his exterior side view mirrors to look rearwardly.

The manufacturers of overland vehicles have approached the problems related to the function and appearance of auxiliary brake lamp assemblies by designing brake lamps having lower relative profiles and by making other automobile body design changes wherein the auxiliary brake lamp is not as visibly apparent when one views the automobile. However, such design modifications have not been completely satisfactory with respect to aesthetic, and other design considerations, as well as with regards to the intended operation of these same devices. More particularly, these devices, in order to be effective, must be conspicuous. This, of course, is contrary to the desire of automobile designers who wish to produce automobiles which have a low-profile and an aerodynamic appearance. Moreover, and with respect to the earlier identified problems related to light trucks, and tractor-trailer combinations, it should be understood that, with respect to light trucks, loads placed in the beds thereof could conceivably obscure such auxiliary brake assemblies if they were mounted in a fashion similar to that used for passenger vehicles. Moreover, commonly employed equipment, such as camper shells and roll bars also tend to obscure such center mounted brake lamps.

Furthermore, additional problems analogous to the mounting of the auxiliary stop lamps exist with respect to various interior warning lights and displays. For example, designers of the interior portions of automobiles have endeavored, through the years, to create stylized, low-profile, and streamlined consoles, and various instrument clusters and accessories for use by the operator, and passengers, of various overland vehicles while simultaneously presenting or placing critical information in a conspicuous location. Frequently the desire for an aesthetically appealing console arrangements was at odds with the need to present critical information in a conspicuous location. These efforts to design aesthetically appealing consoles or instrument clusters have included, but are not limited to, reducing the size and lowering the profile of the console areas; mounting various warning lights in the console in such a fashion that they cannot be seen except when they are energized or otherwise activated; decentralizing the warning lights to assorted different locations in the vehicle such as to the areas of the doors and roof of the passenger compartment; and using assorted electronic displays, to display information of interest to the occupants of the overland vehicle. The overall design process, however, frequently resulted in instrument clusters being somewhat obscured or otherwise difficult to see, particularly for individuals with impaired vision.

While these assorted interior design changes have operated with varying degrees of success relative to styling considerations, they have often presented difficulties for some operators. For example, some console, or instrument cluster displays, and especially consoles which are entirely digital, may be difficult for some operators to read under particular environmental lighting conditions. Furthermore, some operators of these same vehicles complain that these digital displays are often distracting during the operation of the vehicle due to the constantly changing displays, and the close proximity of the several displays, one to the others. Further, operators of such vehicles may have difficulty quickly locating particular instruments, such as a clock, or vehicle compass, for example, when such information is displayed in close proximity to other instruments in the same instrument cluster. In addition to the inconvenience noted above, these console arrangements may actually inhibit an operator from detecting problems or malfunctions, such as when an operator leaves a flashing directional light activated, perhaps for miles, before detecting its presence, and taking corrective action. Moreover, an operator may, from time-to-time, divert their attention from their driving activities for an unsafe period in an attempt to locate particular information. This, of course, can present numerous hazards to the safe operation of the vehicle.

Other attempts have been made in the prior art to solve the problems noted above by employing various optical means which operate to combine images of various instruments and place these same images within the field of view of the operator. This is accomplished by placing the desired instruments or displays within the rearview mirror housing. In this latter instance, the mirror characteristics of such devices have typically been compromised in some fashion to allow the instrument image to emanate from the housing and through the mirror surface to the operator's eyes. Such compromises take on a number of different forms. For example, one such compromise includes etching a clear and discrete window in the mirror or otherwise masking off a discrete window prior to the silvering process such that the instrument to be displayed is readily visible when placed in the window. This technique is shown in the patent to Pastore, U.S. Pat. No. 4,588,267. While this technique is of some use, as a general matter, mirror performance is substantially compromised with each separate indicia or instrument to be displayed, that is, each area of the mirror which includes a discrete window does not function properly as a mirror. In addition, the aesthetic appearance of these modified mirrors are severely degraded. More particularly, each discrete window appears as a blemish, or at best, a crude discontinuity in the manufacture or design of same.

In addition to the foregoing the prior art illustrates other assemblies which combine indicia, or instruments, within mirrors and which suffer from other, equally debilitating drawbacks. For example, and in the device shown in the patent to Pastore, U.S. Pat. No. 4,630,904, mirror discontinuities are eliminated by employing what has been termed a tinted glass plate, or "two-way" mirror. In this particular device the tinted glass plate is not a particularly good reflector and therefore not useful as a rearview mirror. For example, a polished glass reflector such as specified by Pastore typically has an average visible spectrum reflectivity of approximately 4% from each surface, while the minimum useful reflectivity for center rearview mirrors is approximately 70%. Furthermore, the regulations of the Federal Government require that vehicle mirrors must have a visible spectrum reflectivity of 35% or more. Further, assuming that polished tint glass could be modified in some fashion as by using a neutral, half-silvering process to improve reflectivity, the mirror performance would continue to suffer the drawbacks noted above. That is, a tinted, half-silvered mirror continues to be a relatively poor reflector and is an inefficient transmitter.

Therefore, it has long been known that it would be desirable to have an improved mirror assembly for an overland vehicle and which is adapted to be mounted on the vehicle and which does not detract from the stylish appearance thereof, and which further does not substantially inhibit the rearward view of the operator or the overall function of the rearview mirror, the mirror assembly mounted within the line of sight of an operator, and providing a visual signal similar to that provided heretofore by an auxiliary brake lamp or various warning lamps or instrument clusters, and which further may be rendered operable to provide directional signaling information to vehicles following adjacent thereto or information to the operator, and which further acts as a rearview mirror for the same vehicle, the apparatus being both inexpensive to manufacture and sell and characterized by a compact, aesthetically pleasing appearance.

SUMMARY OF THE INVENTION

Therefore it is an object of the present invention to provide an improved mirror assembly.

Another object of the present invention is to provide a mirror assembly which may be manufactured and installed as original equipment on overland vehicles or the like, or which may further be manufactured in the manner of a retrofit.

Another object of the present invention is to provide a mirror assembly which may be readily installed or integrated with other mirror technologies such as motorized actuators; heater elements and films of various types; electrochromic dimming films, or traditional mirrors which have been altered or adapted to provide a means by which light may escape from the mirror housing and be viewed by an observer.

Another object of the present invention is to provide a mirror assembly which is readily adaptable to most all models and designs of commercially available overland vehicles.

Another object of the present invention is to provide in one form a mirror assembly which operates as a combination rearview mirror and brake lamp or directional signaling lamp.

Another object of the present invention is to provide a mirror assembly which includes an electronic circuit which is operable to step-up the voltage supplied to the mirror assembly to a stable level thereby energizing same.

Another object of the present invention is to provide a mirror assembly which includes an electronic circuit which steps-down the voltage supplied to the mirror assembly to a stable level thereby energizing same.

Another object of the present invention is to provide in one form of the invention a mirror assembly which operates to provide a plurality of visual signals, and wherein at least one of the signals is selectively obstructed or blocked by a baffle assembly thereby causing the selected visual signal to be seen, when energized, only from a position along a transmission path which is outside of the line of sight of an operator.

Another object of the present invention is to provide a mirror assembly which includes at least one flat fresnel prism or equivalent light-transmitting deviator or deflector, and wherein the flat fresnel prism or deviator is operable to bend or otherwise direct the light emitted by the mirror assembly along a predetermined transmission path.

Another object of the present invention is to provide a mirror assembly which includes an electronic circuit which is made integral with a circuit board, and wherein the circuit board may be utilized in mirror assemblies which are mounted on opposite sides of an overland vehicle.

Another object of the present invention is to provide a mirror assembly which includes a dichroic mirror which is operable to reflect ambient visible light and which further selectively passes predetermined wavelengths of light.

Another object of the present invention is to provide a mirror assembly which is operable to obtain the individual benefits to be derived from related prior art devices while avoiding the detriments individually associated therewith.

Further objects and advantages are to provide improved elements and arrangements thereof in a mirror assembly for the purposes intended, which is dependable, economical, durable and fully effective in accomplishing these intended purposes.

These and other objects and advantages are achieved in a mirror assembly and wherein, in the preferred embodiment, the mirror assembly includes an enclosure having an aperture; a dichroic mirror borne by the enclosure and substantially occluding the aperture and adapted selectively to pass and reflect light in predetermined wavelengths; and means borne by the enclosure for emitting or receiving light in the wavelengths passed or transmitted by the dichroic mirror, and wherein the dichroic mirror is both an excellent reflector of ambient visible light and an excellent transmitter of the predetermined wavelengths of light generated by the emitting means or received by the receiving means.

BRIEF DESCRIPTION OF THE DRAWINGS

FIG. 1A is the mirror assembly as shown in FIG. 1, the mirror assembly being illustrated as it would appear when it provides a brake signal which is visible to a person located outside of the overland vehicle.

FIG. 1B is a mirror assembly as shown in FIG. 1, the mirror being illustrated as it would appear when it provides a left turn signal which is visible to a person located outside of the overland vehicle.

FIG. 1C is a mirror assembly similar to that shown in FIG. 1 but which is mounted on the opposite side of the overland vehicle from that shown in FIG. 1, the mirror being illustrated as it would appear when it provides a right turn signal which is visible to a person located outside of the overland vehicle.

FIG. 2C represents a perspective view of the mirror assembly showing the underlying structures thereof in phantom lines.

FIG. 4 is a top plan view of the circuit board of the mirror assembly of the present invention as adapted to be used on the driver side of an automotive vehicle, with the light-emitting diodes removed.

FIG. 5 is a bottom plan view of the circuit board of the mirror assembly of the present invention as adapted to be used on the driver side of an automotive vehicle, with the light-emitting diodes installed.

FIGS. 7, 8, 10, and 11 collectively represent an alternate schematic diagram of circuitry which may be utilized with the present invention, and wherein voltage is stepped down. Three separate circuit boards are employed in this form of the invention.

FIGS. 12, 13, and 15 collectively represent a fourth alternate schematic of circuitry which may be used with the present invention, and wherein voltage is stepped down, and a single circuit board is employed.

DETAILED DESCRIPTION OF THE PREFERRED EMBODIMENT

Figure 1:
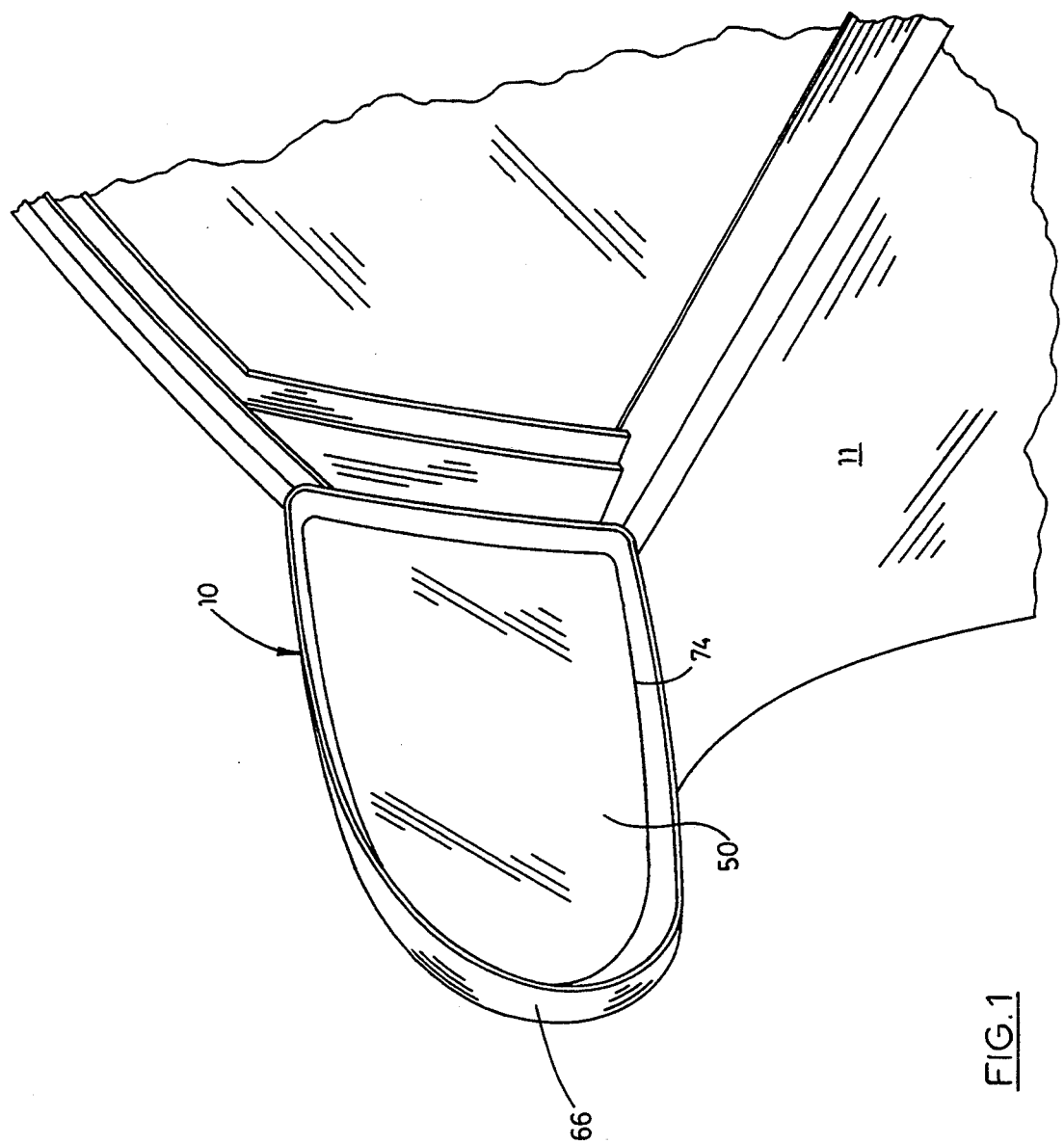
FIG. 1 is a partial environmental, perspective view of the mirror assembly of the present invention, showing the mirror assembly mounted as a side view mirror on the driver side of an overland vehicle.

With reference to the drawings, a mirror assembly in accordance with the present invention is shown generally at numeral 10 in FIGS. 1, 1A, 1B, 1C, 2A, 2B, 2C, and 3, respectively. The mirror assembly 10 operates as a conventional mirror, such as a side rearview mirror as depicted in FIG. 1, when viewed from a first direction by, for example, a driver or passenger seated in an overland vehicle 11. When viewed from a position external to the vehicle 11, the mirror 10 operates as a signaling or warning device, such as a brake lamp (as depicted in FIG. 1A), a left turn signal (as depicted in FIG. 1B), or a right turn signal (as depicted in FIG. 1C).

For illustrative convenience, the mirror assembly 10 which is shown and described herein is discussed as it would be configured if it were installed on the overland vehicle 11 of conventional design (FIG. 1D) and wherein the mirror assembly 10 may be mounted on the vehicle 11 in place of a side view mirrors which are located on the exterior surface of the vehicle 11 on either the driver side, the passenger side, or both. It is to be understood, however, that the invention may be applied in numerous other mirror applications.

As best illustrated by reference to FIG. 1, the mirror assembly 10 which is located on either the driver side, or passenger side of the subject invention, is mounted on an overland vehicle 11 of conventional design having a front end or forward portion 12, and a rear end or portion 13. The overland vehicle 11 has a passenger compartment 14 which includes a front seat 15 and which further defines a position 20 for an operator. The overland vehicle 11 also includes front and rear windscreens 21 and 22, respectively, and further has a longitudinal line of reference 23, a steering wheel 24 and a brake pedal 25. The mirror assembly 10 is mounted on either side of the overland vehicle and in a position exterior to the passenger compartment 14. A rearview mirror 26 is mounted in a position on the interior of the passenger compartment. The overland vehicle 11 further has a hand operated directional signaling switch 27 which is electrically coupled with a directional signaling assembly (not shown) and which provides a visual signal which may alert drivers of other vehicles in the immediate vicinity that the overland vehicle 11 is about to change directions, turn, change lanes, etc.

Figure 1D:
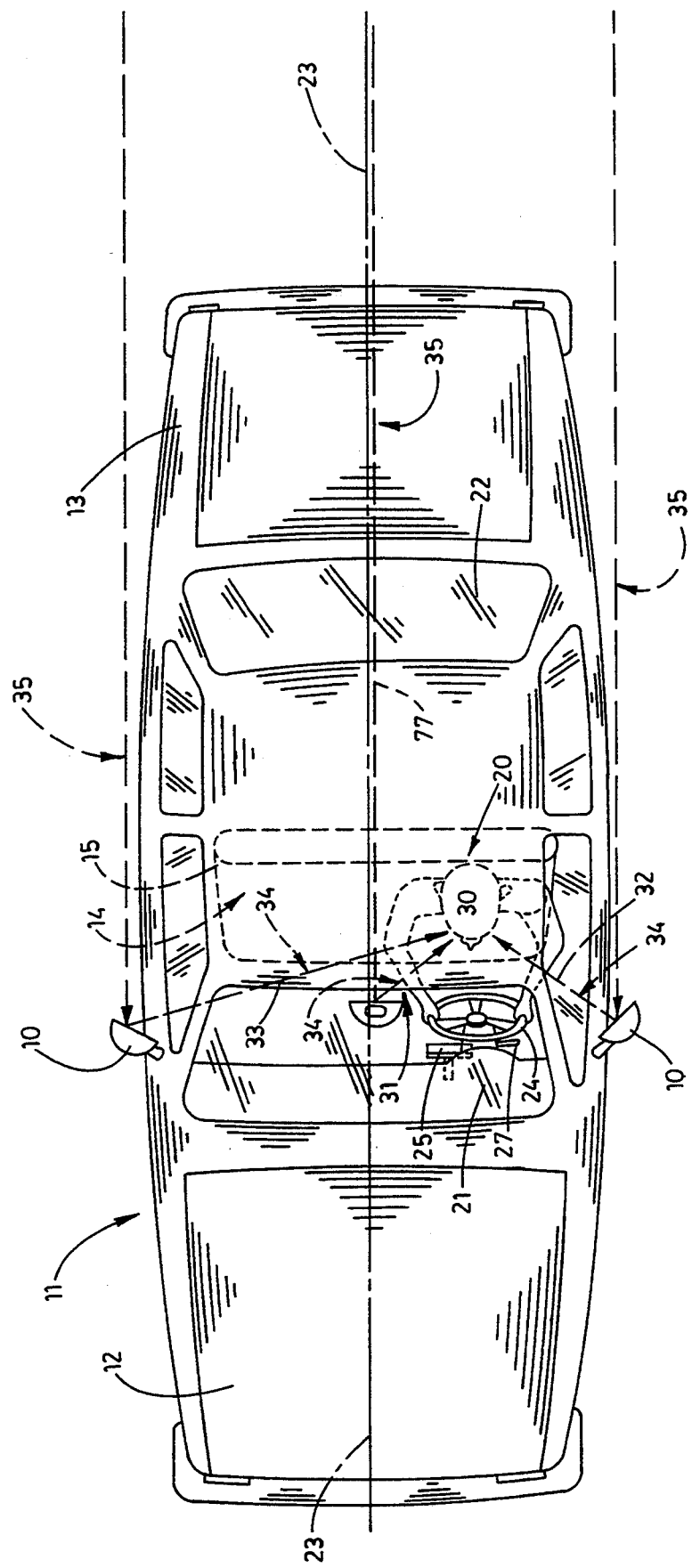
FIG. 1D is an environmental perspective view of the mirror assembly of the present invention shown mounted on an overland vehicle of conventional design.
Figure 1E:
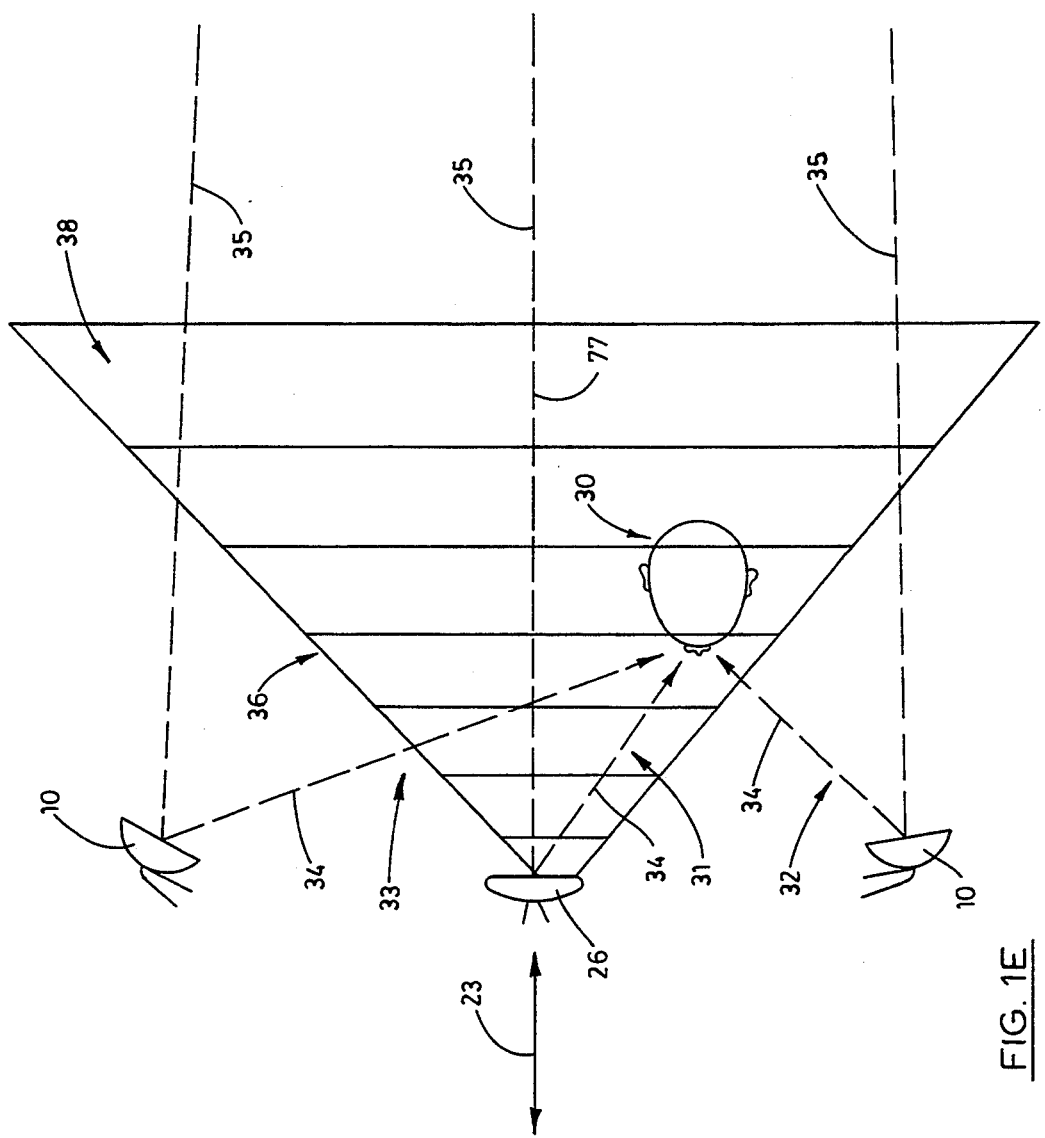
FIG. 1E is a plan view of the present invention shown in an operative embodiment of an overland vehicle and wherein the underlying surfaces have been removed for illustrative convenience.

As best understood by a comparative study of FIGS. 1D and 1E, an operator 30 when located in the drivers position 20, has a field of view which extends approximately 180° from the position of the operator toward the forward portion 12 of the vehicle. Further, and by using the pair of mirror assemblies 10 which are located on the driver side and the passenger side, respectively, the operator 30 may, by looking along predetermined lines of sight, view areas beyond his normal field of view, and rearwardly of the driver position 20. In particular, and as best illustrated by reference to FIG. 1E, the operator 30 has a first line of sight 31, which extends from the operator 30, to the rearview mirror 26 and which permits the operator to view rearwardly of the vehicle 11 and substantially along the longitudinal line of reference 23. The operator 30 further has a second line of sight 32 which extends from the operator to the mirror assembly 10 on the left or driver side of the vehicle 11 and rearwardly thereof 35 and which permits the operator 30 to view rearwardly of the overland vehicle along a line of sight which is somewhat generally parallel to the longitudinal line of reference 23. Furthermore, the operator has a third line of sight 33 which extends from the position 20 to the mirror assembly 10 on the passenger side and rearwardly thereof 35A. It similarly permits the operator 30 to view along the longitudinal line of reference and rearwardly of the overland vehicle. The zone labeled 38 generally represents the areas which an operator may view rearwardly of the vehicle when he/she views along the first line of sight 31.

Figure 2A:
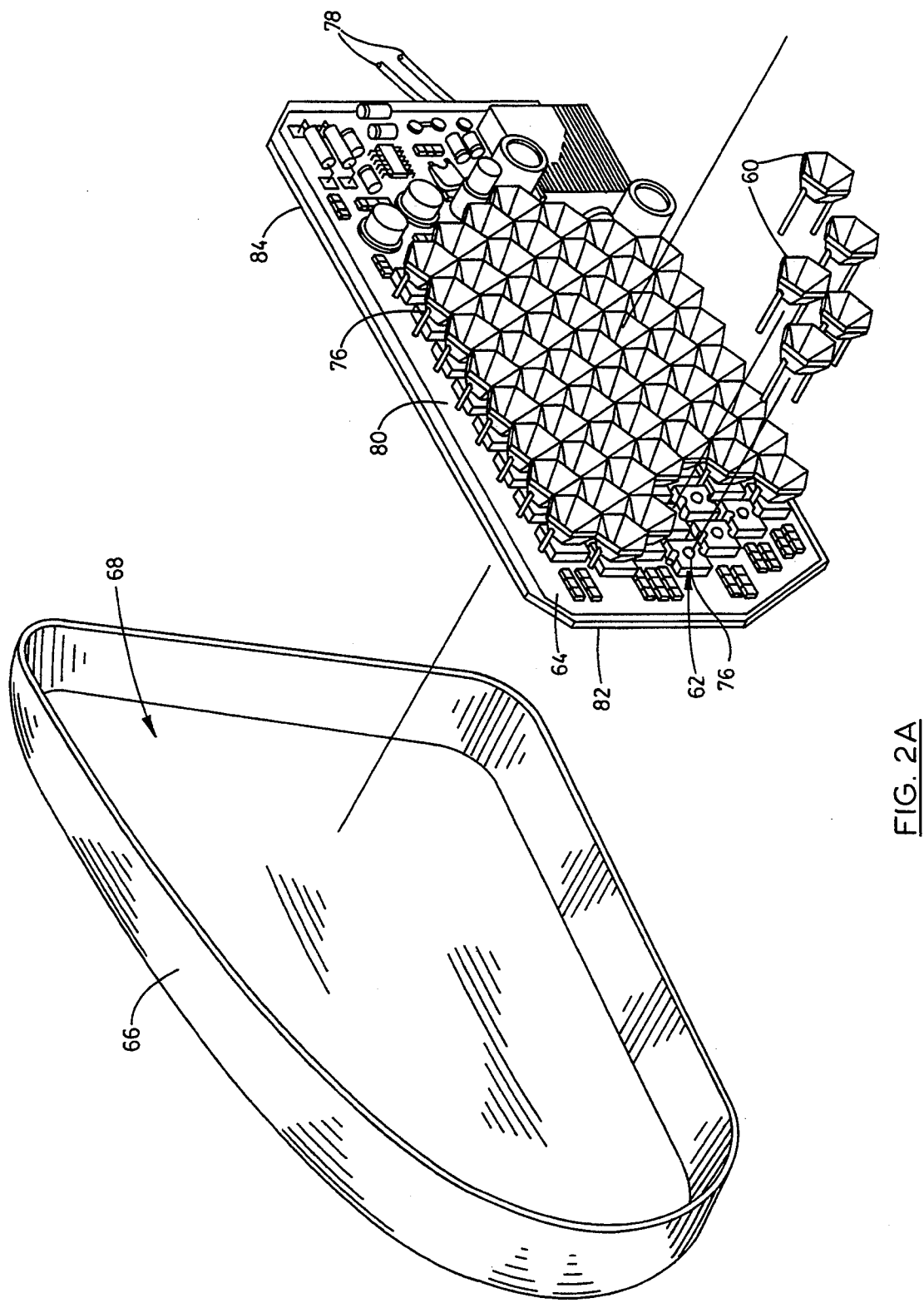
FIGS. 2A and 2B collectively represent an exploded perspective view of the mirror assembly showing the disassembled parts thereof.
Figure 2B:
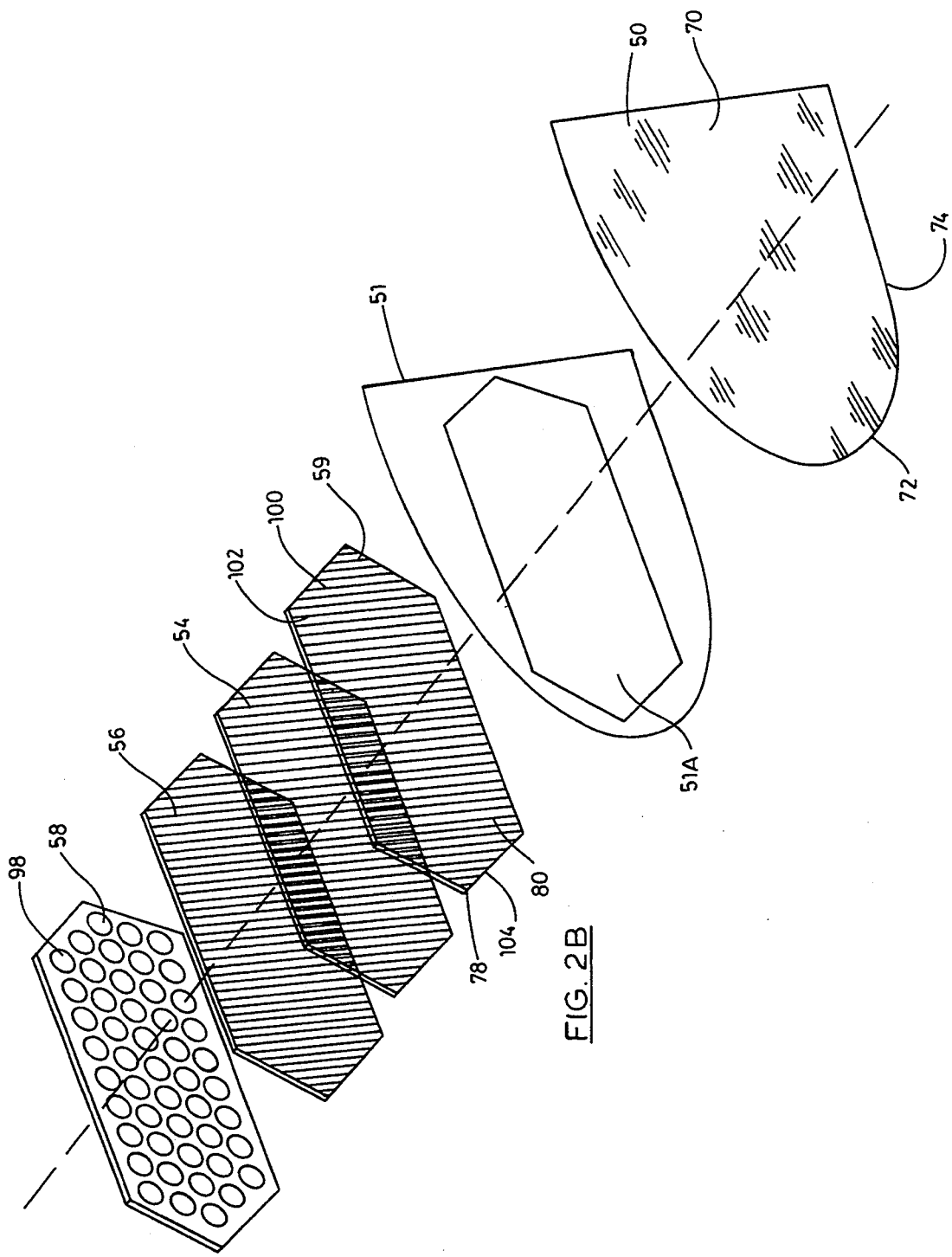

As best illustrated in FIGS. 2A and 2B, the mirror assembly 10 comprises a dichroic mirror 50, an opaque masking layer 51, a baffle assembly 52, a first fresnel prism sheet 54, a second fresnel prism sheet 56, an array of convexo-convex lenses 58, at least one hexagonal reflector 60, a light source 62, and a circuit board 64. These parts are mounted within a frame or housing 66 on the exterior surface of the vehicle 11. The frame or housing 66 defines a cavity 68. The mirror assembly 10 is no different in its exterior appearance from that of a standard side view mirror as shown in FIG. 2C. The mirror assembly 10 also includes circuitry which is explained in greater detail below. As should be understood, a secondary, supporting structure (not shown) would support the elements described above in a proper relationship in the cavity 68. As should be understood, "forwardly" and "rearwardly" when referring to the dichroic mirror 50, the opaque masking layer 51, the baffle assembly 52, the first fresnel prism sheet 54, the second fresnel prism sheet 56, the array of convexo-convex lenses 58, the hexagonal reflectors 60, the light source 62, and the circuit board 64 is not to be confused with the front and rear orientations of the vehicle as discussed above.

The dichroic mirror 50 is a semi-transparent mirror which selectively passes and reflects light having predetermined wavelengths. As explained in greater detail hereinafter, the light source 66 is operable to produce artificial light having the wavelengths including the band from 600 to 700 nanometers and which corresponds with the visible spectrum color red. Of course, should a different visible color or non-visible spectral band be desired, then a different dichroic mirror would be selected which would preferentially transmit or pass the wavelengths corresponding with the spectral band color selected. As should be understood, the dichroic mirror 50 is operable to transmit or pass wavelengths which predominately fall within a narrow spectral band which is not greater than 150 nanometers in width. The dichroic mirror 50 has a first forward or external facing surface 70, a second or rearwardly facing surface 72, and a peripheral edge 74 which closely fits cavity 68 of the frame 66 thereby substantially occluding the cavity 68. This dichroic mirror construction essentially inhibits any light leakage from the light source 70 which is mounted internally of the cavity 68. Suitable dichroic mirrors are manufactured by Photon Technologies which is located in Santa Clara, California. As should be understood, when used herein, "forward facing" when referring to the mirror assembly 10 means the mirror is oriented in a fashion such that the operator 30 may view in a predetermined direction along the axis of the vehicle 11. This may, of course, permit the operator to look rearwardly of the vehicle 11 in a standard automobile, but does not exclude the possibility that the mirror assembly 10 could be oriented to look forwardly of the vehicle 11 in particular applications.

It should be understood that the light source 62 must be operable to produce wavelengths of light which are substantially "matched," that is, having wavelengths which are substantially similar to the peak wavelength transmittance characteristics of the dichroic mirror 50 and which is mounted on the enclosure 50 and disposed in substantially occluding relation relative to the cavity 68. For purposes of this invention the terms "transmit" or "transmittance" shall mean the passage of electromagnetic radiation through an associated mirror. Further, the term "pass or passage" shall also describe this same phenomenon. In the present form of the invention, the light source 62 is operable to produce artificial light having wavelengths which include the 600 through 700 nanometer range, and which manifests itself by producing the color red. The invention, however, is not limited to the peak wavelengths recited herein, but may further be used with any number of wavelength combinations such that any visual spectrum colors can be seen or any invisible spectral bands may be emitted. Further, it has been found that the preponderance of visible light emitted by the light source should reside in a band not greater than 150 nanometers wide. Moreover, the present invention could include more than one lighting source, each of which produces individually discrete spectral bands of light. In this situation, however, a dichroic mirror would be employed which would include discrete areas whose transmission characteristics were individually "matched" to the light sources immediately adjacent thereto.

The light source 62 includes a modular LED (light emitting diode) array or a bank of LEDs 76 which are individually mounted on the circuit board 64 and which produce artificial light having wavelengths which include the 600 through 700 nanometer band. LED's may be manufactured which produce other wavelengths or colors, such as amber, green, or infrared, however, in such a case, the dichroic mirror employed with same would include discrete areas whose individual transmission characteristics would be substantially "matched" to the wavelengths of light which are emitted by the LEDs which are immediately adjacent thereto. A commercially available LED which fits these performance characteristics is manufactured by Mitsubishi Cable Industries Ltd. of Tokyo, Japan under the trade designation "MLY2-RNO5 through MLY2-RN20". Another commercially available LED includes the HPWR-A200 and which is manufactured by Hewlett Packard of San Jose, Calif. The commercially available LEDs, which are noted above, have high efficiency and are ultra-radiant red LEDs which have a narrow viewing angle and a peak wavelength which falls within the 600 through 700 nanometer band. Each of the respective LEDs 76 has a transmission path which is oriented in a direction perpendicular to the circuit board 64. Suitable electrical leads 78 would electrically connect the bank of LEDs with the braking, or signaling assembly, power supply or other control circuitry of the vehicle (not shown) as appropriate.

Figure 3:
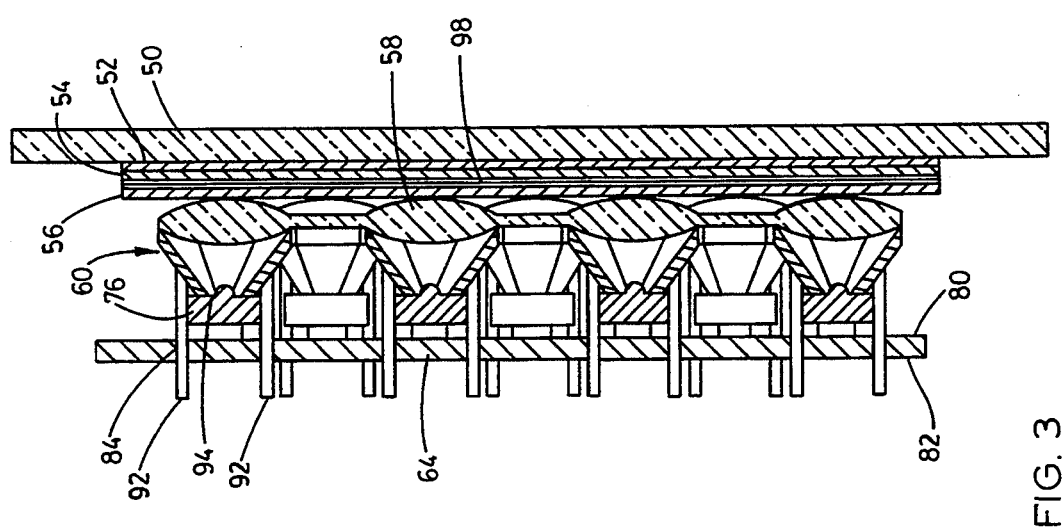
FIG. 3 is a partial, vertical, cross-sectional view of the mirror assembly showing the assembled parts in relationship one to another.

The circuit board 64 has a forwardly facing or top surface 80, a rearwardly facing or bottom surface 82, and a peripheral edge 84 which is shaped to fit within the cavity 68. FIG. 4 illustrates the top plan view, and arrangement of the circuit board for the case of the mirror assembly 10 which is used on the driver side of the vehicle. The electrical leads 78 are oriented on the right side of the circuit board and facilitate wire routing to the braking, signaling assembly, power supply, or other control circuitry of the vehicle 11. FIG. 5 shows the bottom plan view of the same circuit board. It is to be understood that a circuit board which is used on the passenger side of the vehicle is a mirror image of that used on the driver side and which is represented in the drawings. The electrical leads 78 are oriented on the left side of the circuit board and facilitate wire routing to the braking, signaling assembly, power supply, or other control circuitry of the vehicle 11. Referring more particularly now to FIG. 5, the array or bank of LEDs 76 is generally mounted on the forwardly facing surface 80 in a generally hexagonal dispersion pattern. As will be discussed in greater detail, hereinafter, and depending upon the signal desired to be transmitted to a person located outside of the overland vehicle 11, it may be possible to energize all of the LEDs 76 and have them remain lighted, to represent a brake signal, such as depicted in FIG. 1A. Also, it may, alternately, be possible to energize a subset or smaller number of the bank of LEDs 76 and have them flash intermittently to represent either a left turn signal (as shown in FIG. 1B) or a right turn signal (as shown in FIG. 1C). It may further be possible to energize all of the LEDs 76 in a rapidly intermittent or strobe-like fashion to signal that the vehicle is in reverse, or backing up. Further details of the circuitry to accomplish these lighting variations are described in detail hereinafter, as are the specifics of the optics which are employed to direct the light emitted by the light emitting diodes 76 along a predetermined path such that it may be viewed by a person positioned outside of the vehicle, but which cannot be seen by the operator 30. Also forming a part of the circuit board is a thermistor 81, a photoelectric sensor 82, and other electronic components, wiring, and connectors which form a part of the circuitry of the present invention, and which will be discussed in greater detail hereinafter. As best seen in FIGS. 3 and 4, a plurality of discrete pairs of anchoring holes 84 are formed in the circuit board and are located adjacent to each of the LEDs 76. These individual pairs of apertures serve to secure each of the hexagonal reflectors 60 on the circuit board 64.

Figure 6A:
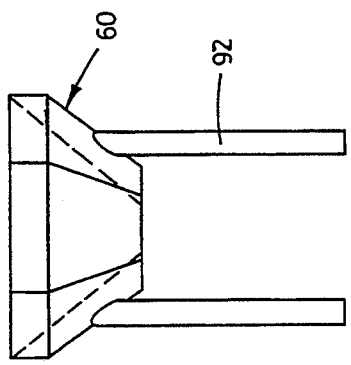
FIG. 6A is a somewhat enlarged, side elevational view of one of the hexagonal reflectors employed in the present invention.
Figure 6B:
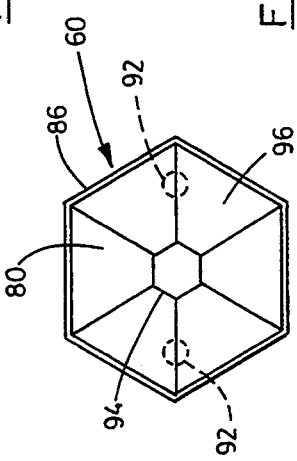
FIG. 6B is a top plan view of one of the hexagonal reflectors employed in the present invention.
Figure 6C:
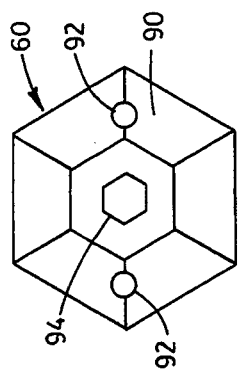
FIG. 6C is a bottom plan view of one of the hexagonal reflectors employed in the present invention.

FIGS. 6A, 6B, and 6C represent one of the exemplary hexagonal reflectors 60. The reflector 60 comprises a hexagonal peripheral edge 86, an internal boundary 88, an external boundary 90, two pins 92, and an aperture 94 which is defined by the internal boundary. The internal boundary 88 has a highly reflective surface applied thereto as by vacuum metallization or similar techniques well known in the art and is shaped like an inverted hexagonal, frusto-pyramid, being formed of six sloping flat surfaces 96. Near the apex of the inverted frusto-pyramid is the aperture 94 which is defined by the internal boundary. The two pins 92 extend from the external boundary 90 and in generally parallel relationship, one to the other. The individual pins are matingly received within a pair of anchoring holes 84 which are defined by the circuit board 64. When each of the reflectors 60 is appropriately positioned, the individual apertures 94 are aligned or otherwise disposed in registry with the respective LED's so that light emitting from that particular LED is reflected substantially forward of the forwardly facing surface 80, of the circuit board 64 by means of the reflective surface which is made integral with the internal boundary 88. This is best seen by reference to FIG. 3. When all of the LEDs 76 are properly positioned relative to their respective reflectors 60, the reflectors are disposed in a tightly packed honeycomb configuration, such as is depicted in FIGS. 2A and 3, respectively. As should be understood, the reflectors noted above may be manufactured as a single reflector having individual elements which are substantially similar to the single reflectors 60 discussed above. When the single reflector 60 is manufactured, of course, the individual pins 92 would not be required, rather, only a couple of pins would be necessary to orient the single reflector 60 in a proper position on the circuit board 64.

Immediately forward of the circuit board 64 and the hexagonal reflectors 60 is the array of convexo-convex lenses 58. As best seen in FIGS. 2B and 3, the array of convexo-convex lenses 58 are formed in a single transparent plastic piece 98. In the array 58, there is a single convexo-convex lens for each of the reflectors 60. The array is configured or otherwise arranged such that the center of each of the respective convexo-convex lenses are disposed in substantial alignment with the beam centers of each of the respective LED's 76. The array of convexo-convex lenses 58 further serves to collimate the light emitted from the respective LEDs and reflected in a forward direction by the reflectors 60 upon passage through the convexo-convex lenses 58, and to magnify the apparent LED real luminous area, that is, the area of luminosity which can be discerned by the human eye.

The baffle assembly 52 is positioned intermediate the dichroic mirror 50 and the light source 62. The baffle assembly 52 includes a polymeric-based light control film which permits artificial light generated by the light source 50 to escape from the cavity 68. The light control film, which is manufactured by the 3M Company under the trade designation LCF-P (light control film), is a thin plastic film enclosing a plurality of closely spaced, black colored microlouvers 69. The light control film is approximately 0.030 inches (0.75 millimeters) thick, and the microlouvers are spaced approximately 0.005 inches apart (0.127 millimeters). The microlouvers 69 may be a transparent black or an opaque black, and further, the microlouvers may be positioned in various angular positions to provide a viewing angle, which may include angles as narrow as 48°±6° or as wide as 90°±15°. It should be understood that the baffle assembly permits light emitted by the light source 62 to escape within the predetermined viewing angle from the cavity 68 and travel rearwardly of the overland vehicle 11 along the transmission path viewable from a position outside of the vehicle 11. The light control film is operable to inhibit or block the light emitted by the light source 62 from traveling outside the predetermined viewing angle and along the first component 34 of the second line of sight 32 and into the view of the operator 30 for the case of the mirror assembly 10 mounted on the drivers side of the overland vehicle. The light control film is further operable to inhibit or block the light emitted by the light source 62 from traveling outside the predetermined viewing angle and along the first component 34 of the third line of signal 33 and into the view of the operator, for the case of the mirror assembly 10 mounted on the passenger side of the overland vehicle. This is best seen by reference to FIGS. 1D and 1E, respectively. It should be apparent, therefore, that the operator may continue to use the mirror assembly 10 as a rearview mirror notwithstanding that artificial light is being emitted from same and is capable of being seen from a location rearwardly of the mirror assembly 10. Further, and as best seen in FIG. 2B, and 2C, the light control film is disposed in partially occluding relation relative to the cavity 68 and in substantial alignment relative to the light source 62.

The baffle assembly 52 has a forwardly facing or front surface 76, and a back or rearwardly facing surface 78. Further, the light control film is defined by a peripheral edge 80. As shown in the drawings, the light control film has a transverse dimension which closely fits the interior dimensions of the cavity 68 as defined by the frame 66, although, alternately, the light control film can be substantially smaller in area than the aperture defined by the housing, as shown in FIG. 2B. In this situation, the rearward surface of the dichroic mirror 50 would be covered with the opaque masking coating 51, thereby defining an area 51A which is disposed in registery with the light control film. In an alternate form of the invention the light control film could be replaced by one or more baffle assemblies which may include several plates, louvers or blinds which may be oriented in such a fashion so as to permit the signals to emanate into the desired illumination zone while inhibiting their observation from areas where they might be undesirable or could conceivably cause distraction. Furthermore, the frame 66 could be designed or rendered operable, for this same purpose, in some applications.

The first and second fresnel prism sheets 54 and 56, respectively, are positioned intermediate the dichroic mirror 50 and the light source 62, and rearwardly of the baffle assembly 52. The fresnel prism sheets 54 and 56 individually serve to bend or otherwise direct the collimated light which has passed through the array of convexo-convex lenses 58. The light may be bent by either or both of the fresnel prism sheets toward the predetermined viewing angle established by the baffle assembly 62 to minimize light losses. Either or both of the fresnel prisms may also be used to bend the light up or down relative to the position of the mirror assembly 10 as mounted on the vehicle 11. The combination of the first and second fresnel prism sheets 54 and 56 thereby redirect the collimated light from the lens array to where it may be viewed from a position rearwardly of the overland vehicle. In particular, it should be understood that vehicle platforms, as a general matter, are positioned or otherwise located at different distances above the surface of the earth. For example, a small sports car will place the operator's hips mere inches above the surface of the earth. In contrast, a tractor-trailer operator may be located several feet above the earth. In the order to make the present device useful on all vehicle platforms, the fresnel prism sheets 54 and 56 are provided. In this regard, each fresnel prism sheet bends or otherwise directs the light emitted by the light source 62 such that it is angled upwardly or downwardly in a predetermined fashion appropriate to the height of the vehicle platform. For example, if the device 10 was mounted on a sports car, the fresnel prism sheets would operate in combination to angle the light emitted by the light source generally upwardly and outwardly so it could be seen by the operators of higher or taller vehicle platforms such as tractor-trailers or the like. Conversely, if the device 10 was employed on a tractor-trailer, the fresnel prism sheets would operate in combination to bend or otherwise direct the light downwardly such that it could be seen by the operators of low, or similar vehicle platforms such as sports cars, motorcycles, bicycles, or the like.

FIGS. 7 through 15 are schematic representations of circuitry which may be utilized in accordance with the present invention 10. As denoted hereunder, a "single board" system is one in which the circuitry for one mirror assembly 10 is wholly located at the same location as the rest of the physical components of the mirror assembly 10, including the dichroic mirror 50, the opaque masking coating 51, the baffle assembly 52, the first fresnel prism sheet 54, the second fresnel prism sheet 56, the array of convexo-convex lenses 60, and the light source 62. Each mirror assembly is therefore a stand-alone system so that a mirror assembly which may be located on the driver side of the vehicle 11 operates completely independently of a mirror assembly which is located on the passenger side of the vehicle 11. A "three board" system is, in contrast, one form of the invention in which a portion of the circuitry from one mirror assembly 10 is located at the same location as the physical components of the mirror assembly, but other portions of the circuitry are located remotely from the physical components and shared with another mirror assembly. A mirror assembly 10 which may be located on the driver side of the vehicle 11, therefore shares certain portions of its circuitry with the mirror assembly 10 which is located on the passenger side of the vehicle, but the LEDs 76, ballast resistors, the thermistor 80, the photoelectric sensor 82 are examples of circuitry components which remain independent and which are located with the respective mirror housing 66. Each of these elements will be discussed in greater detail hereinafter.

The three board system therefore includes: (1) circuitry specific to the driver side mirror assembly; (2) circuitry specific to the passenger side mirror assembly; and (3) central control circuitry which is remote to and jointly shared by the driver and passenger side mirror assemblies. An advantage of the single board system is that each mirror assembly 10 contains its own controls so that a component failure in one mirror assembly does not affect the performance of the other mirror assembly. Another advantage to the fully integrated nature of the single board system is that it keeps connections to a minimum and thereby increases reliability. For example, when a low cost mirror assembly 10 is designed which only includes turn signal capabilities, the single board system has the further advantage of having extremely simple electrical interface requirements and costs. On the other hand, the three board system has the advantage of eliminating redundant control interfaces. In this regard, the remotely located or "satellite" circuit boards have circuitry which is specific to the driver side mirror assembly and to the passenger side mirror assembly, respectively, and are smaller in size than the single board systems, thus allowing for facilitated retrofitting into existing frames 66 or for larger arrays or banks of LEDs 76.

As used herein, "step up" voltage regulation refers to a stepping up or transformation of the voltage of the automobile to a constant, more useful level. "Step down" voltage regulation refers to a stepping down or transformation of the voltage of the automobile to a constant, more useful level. Because LEDs require constant voltage and the voltage of an automobile may be subject to fluctuations from any number of different sources, for example, a weak battery, an improperly connected battery jump, surges or drains by other electrical devices in the automobile, or for other reasons, it is necessary that the voltage be stepped up or stepped down to a constant level. To further provide for stable control of the voltage supplied to the respective LEDs 76, a ballast resistor, as discussed hereinafter, is placed in series with a column of the LEDs 76. As will be appreciated, a ballast resistor is generally considered to be a linear device and can consequently be relied upon for defining the amount of current flow for a given amount of voltage.

Figure 7:
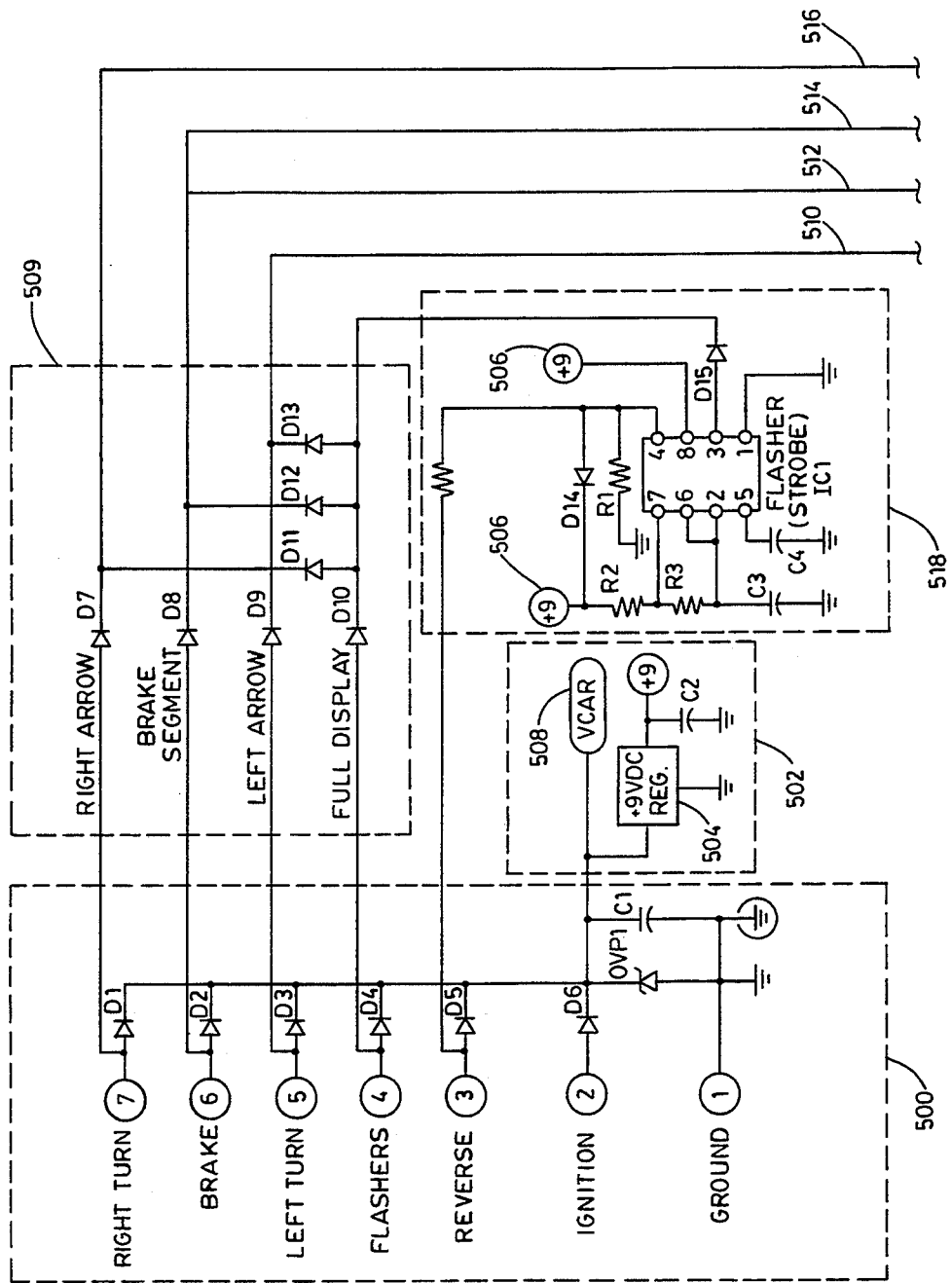
FIGS. 7, 8, 9, and 10 collectively represent a schematic diagram of the circuitry which may be employed with the present invention, and wherein the voltage is stepped up. Three separate circuit boards are employed in this form of the invention.

FIGS. 7, 8, 9, and 10 collectively represent a schematic illustration of the circuitry which will step up voltage and wherein three boards are employed. Referring first to FIG. 7, at the box designated by the numeral 500, input reverse bias protection and overvoltage protection are provided. More specifically, power is provided to the circuit board at diode D1 (right turn), diode D2 (brake), diode D3 (left turn), diode D4 (flashers), diode D5 (reverse), and diode D6 (ignition), while simultaneously providing reverse or negative protection. OVP1 provides overvoltage protection while capacitor C1 provides filtration. At the box marked with the numeral 502, a 9 volt dc power supply is represented. Voltage from diodes D1, D2, D3, D4, D5, and D6 are routed by electrical conduits to a linear 9 volt dc voltage regulator 504. The output of the regulator 504 is filtered by capacitor C2, which is then routed to the control electronics which are designated by the numeral 506. At numeral 508, Vcar is routed to the LED power supply, discussed below. The box labeled by the numeral 509 represents the LED array control diode logic. The alpha-numeric designation diode D7 (right arrow); diode D8 (brake segment); diode D9 (left arrow); diode D10 (full display); and diodes D11, D12, and D13 provide steering logic and are electrically coupled along lines 510, 512, 514, and 516, respectively, and to array control FETs, explained in greater detail below, in order to render operable the desired LED arrays for a particular input response.

The box designated by the numeral 518 represents the reverse strobe oscillator. Integrated chip 520 is a 555 type timing circuit. The output of the timer 520 is an 8 hertz 50% duty cycle pulse train. The diode component designated by the alpha-numeric designation D14 dumps voltage above 9 volts dc back into the 9 volt dc power supply, thus protecting the reset pin designated "4." Resistors which are designated R2, R3, and capacitor C3 have operational values which facilitate the $R_TC_T$ timing oscillations. This creates the required output pulse train. Resistor R1 pulls the reset pin "4" low, thus stopping the output pulse train whenever voltage is not applied to the reverse input pin designated as "3." The diode component D15 blocks voltage coming from the flashers pin designated as "4," thus protecting the timer. If the timer is active, diode D15 is forward biased and provides voltage to the LED array control and FETs which are electrically coupled along electrical conduits 510, 512, 514, and 516, respectively, and which are discussed in greater detail below.

Figure 8:
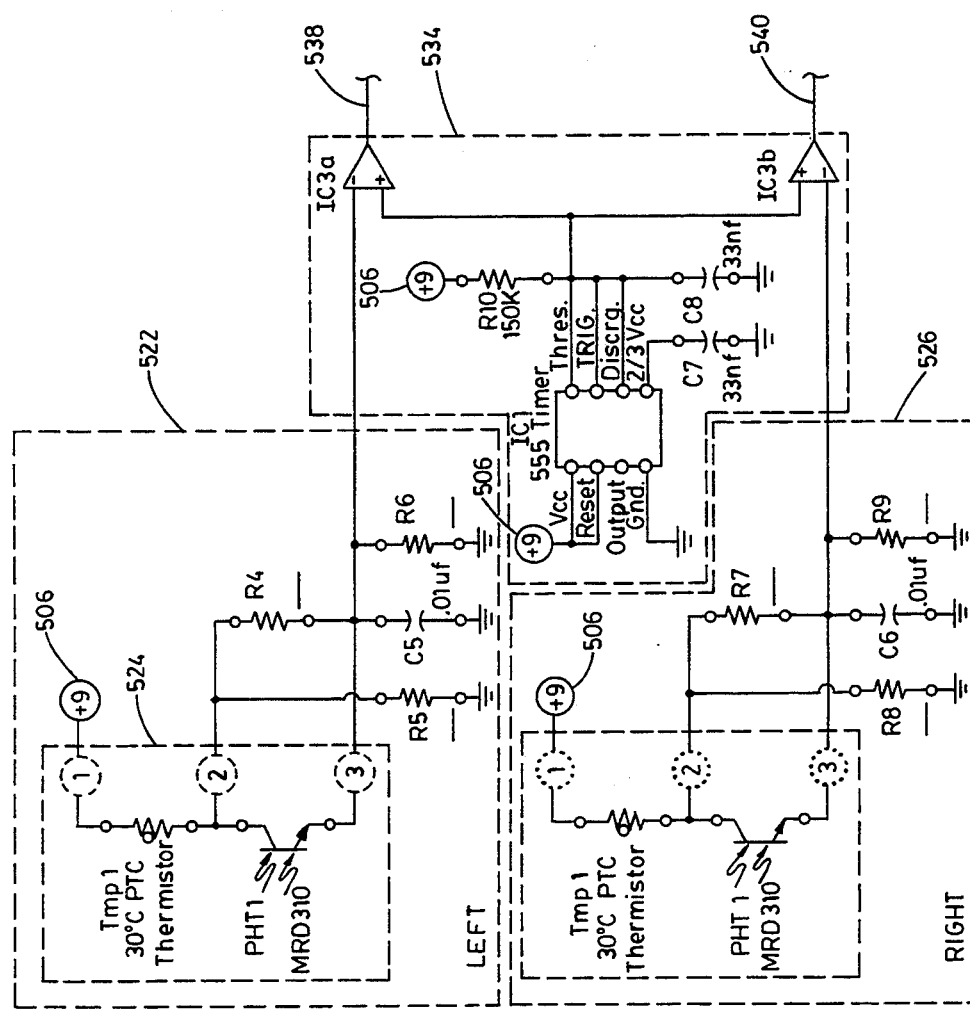

Referring now to FIG. 8, the ambient light and LED temperature feedback network is now described. This portion of the circuit is responsible for providing a dc voltage that is substantially proportional to the light intensity of the ambient background light and which is derated or decreased for purposes of protecting the respective LEDs as the temperature of the respective LEDs increases. Referring in particular to the box designated by the numeral 522, and during occasions wherein the temperature is below 50°, the resistance of PTC thermistor TMP1 is approximately 50 ohms. This resistance is used in a voltage divider defined by TMP1 and which is performed by resistor R5. The voltage at the node of TMP1 and resistor R5 is controlled by the resistance of TMP1. During occasions where the temperature is below 50° TMP1 is about 50 ohms which has little effect on the node voltage. As the temperature increases to 80° C., the resistance of TMP1 rises to 2K, thus causing the node voltage to become ½ Vcc, or 4½ volts. This voltage is connected to PHT1. PHT1 is a phototransistor that changes the current gain in a fashion which is substantially proportional to the intensity of the ambient background light. During "dark" ambient lighting conditions, the resultant output voltage is set by the ambient temperature and the voltage divider of resistors R4/R6. As the background ambient lighting levels increases, more current is allowed to flow to resistor R6, thus increasing the output voltage. Capacitor C5 is used to control and filter delta V/delta T and delta V/delta light. As shall be understood, the portion of the circuitry represented by box 524 is located at the same location as the physical components of the mirror assembly 10, that is, in the frame 66. The box 522 and the box 524 represent a portion of the circuitry specific to the driver side mirror assembly. Further, boxes 526 and 528 represent a portion of the circuitry specific to the passenger side mirror assembly. The operation of the circuitry contained in boxes 526 and 528 are therefore analogous to the operation of the boxes 522 and 524, respectively.

Figure 10:
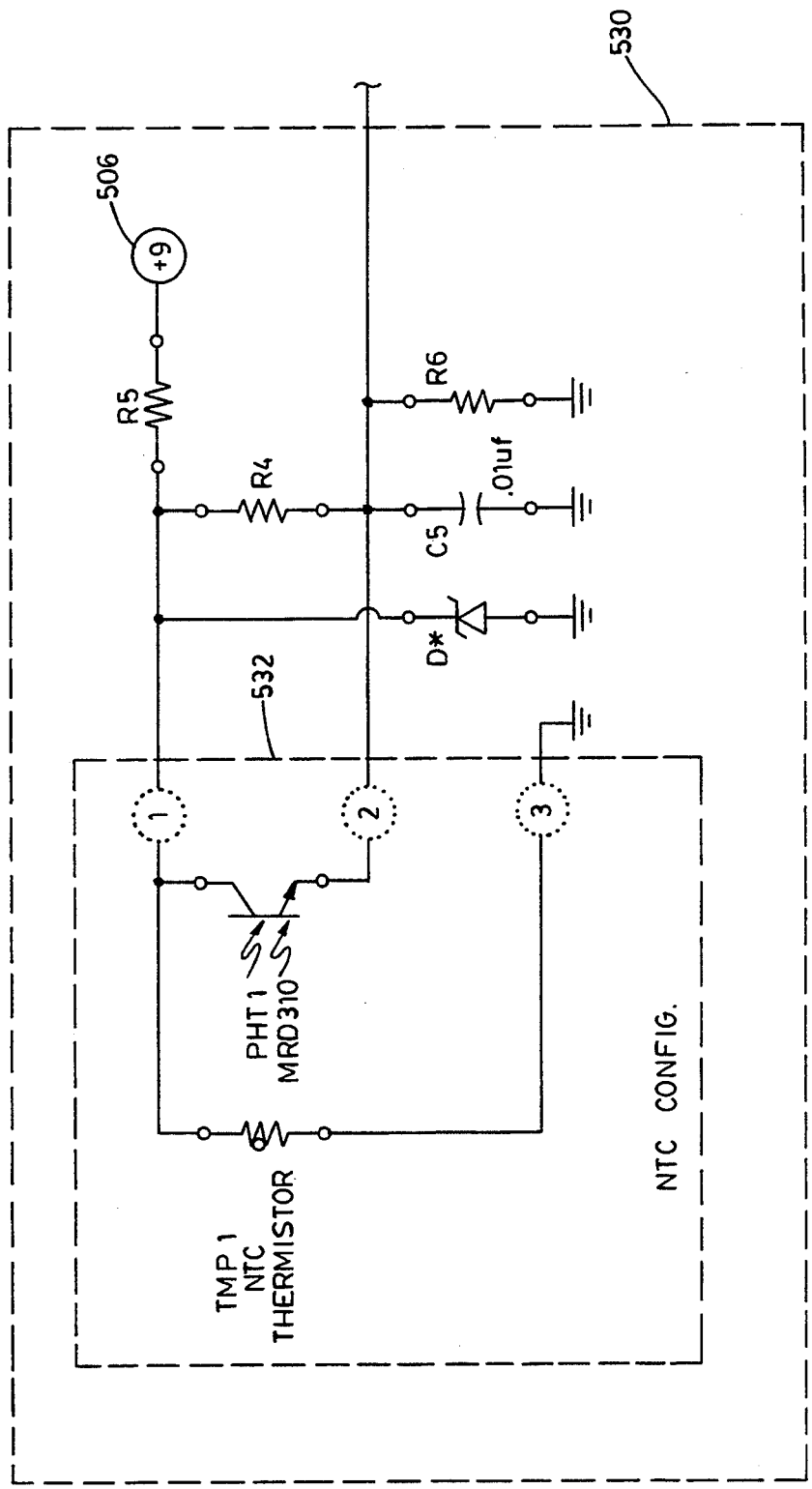

FIG. 10 shows an alternate configuration for the ambient light and LED temperature feedback circuit portions, discussed above. The circuitry located within box 530, as depicted in FIG. 10, can be utilized in place of the circuitry contained within box 522 shown in FIG. 8. The circuitry of FIG. 10 also incorporates an NTC thermistor in place of a PTC thermistor. In this configuration, the temperature compensation voltage is controlled by the voltage divider resistor R5 and TMP1. During normal operation (below 70°), the resistance of TMP1 is great enough so that:

$$TMP1 \times (9/(R5+TMP1))$$

is greater than 7 volts dc. Therefore, D, is in its zener region and limits the voltage across the thermistor TMP1 to 7 volts dc. As the temperature increases, the resistance of the thermistor TMP1 decreases. As the temperature approaches 75°, $$TMP1 \times (9/(R5+TMP1))$$

is less than 7 volts dc and derating or decreasing of the voltage across the thermistor TMP1 occurs. As noted above, the configurations of PHT1, and resistors R4, R6, and capacitor C6 is identical to the circuitry contained in box 522 which is illustrated in FIG. 8 and therefore performs in the same fashion. The portion of the circuitry shown in box 532 is located at the same location as the physical components of the mirror assembly 10, that is, in the frame 66.

Returning now to FIG. 8, a PWM (pulse width modulation) oscillator and level detector is illustrated in the box designated by the numeral 534. The components illustrated in the box 534 are used to create a sawtooth wave form that operates in the range between 3 volts dc to 6 volts dc. The frequency of the sawtooth wave is set to a predetermined level to cause the cycling to occur at a rate great enough so that the display appears to operate at a steady state (at a frequency greater than 40 Hertz). This predetermined frequency is kept low enough so as to minimize the effects of switching times, and to minimize, to the extent possible, heat developed in the array control FETs, which are explained in greater detail below. Resistor R10 and capacitor C8 set the frequency. Capacitor C7 provides filtration. As further illustrated in FIG. 8, the negative terminals of comparators IC3a and IC3b are electrically connected to the output of the PWM oscillator. The positive inputs of comparators IC3a and IC3b are electrically connected to the output of the ambient light and temperature network as discussed earlier. Whenever the positive voltage on comparators IC3a or IC3b is greater than the negative input, the output of the comparator goes to a high state. If, for instance, the brakes were applied during the high cycle, current would flow through the steering logic diode D8 (box 509, FIG. 7), through resistors R12 and R13, respectively, and then onto the gates "g" of LB FET and RB FET, thereby causing the FETs to turn "on" and conduct current from the LED power supply (explained below) through the left and right brake arrays (shown in FIG. 9, below), and further through resistors R18 and R19 (also shown in FIG. 9, below), and finally through the FETs, and finally, to ground, thus illuminating the display. When the positive input of comparators IC3a or IC3b falls below the negative input or, conversely, if the negative input is greater than the positive input, the output of comparators IC3a or IC3b goes low, that is, to ground. This diverts current from the LB and RB FET gates through diodes D17 and D18, consequently turning the FETs off which, in turn, turns off the display. The FETs and certain logic diodes are shown in the box which is designated by the numeral 536 of FIG. 8. Electric conduits 510, 512, 514, and 516 are individually interconnected between FIGS. 7 and 8. Further, electrical conduits 538, 540, 542, and 544 are interconnected between FIGS. 8 and 9.

Figure 9:
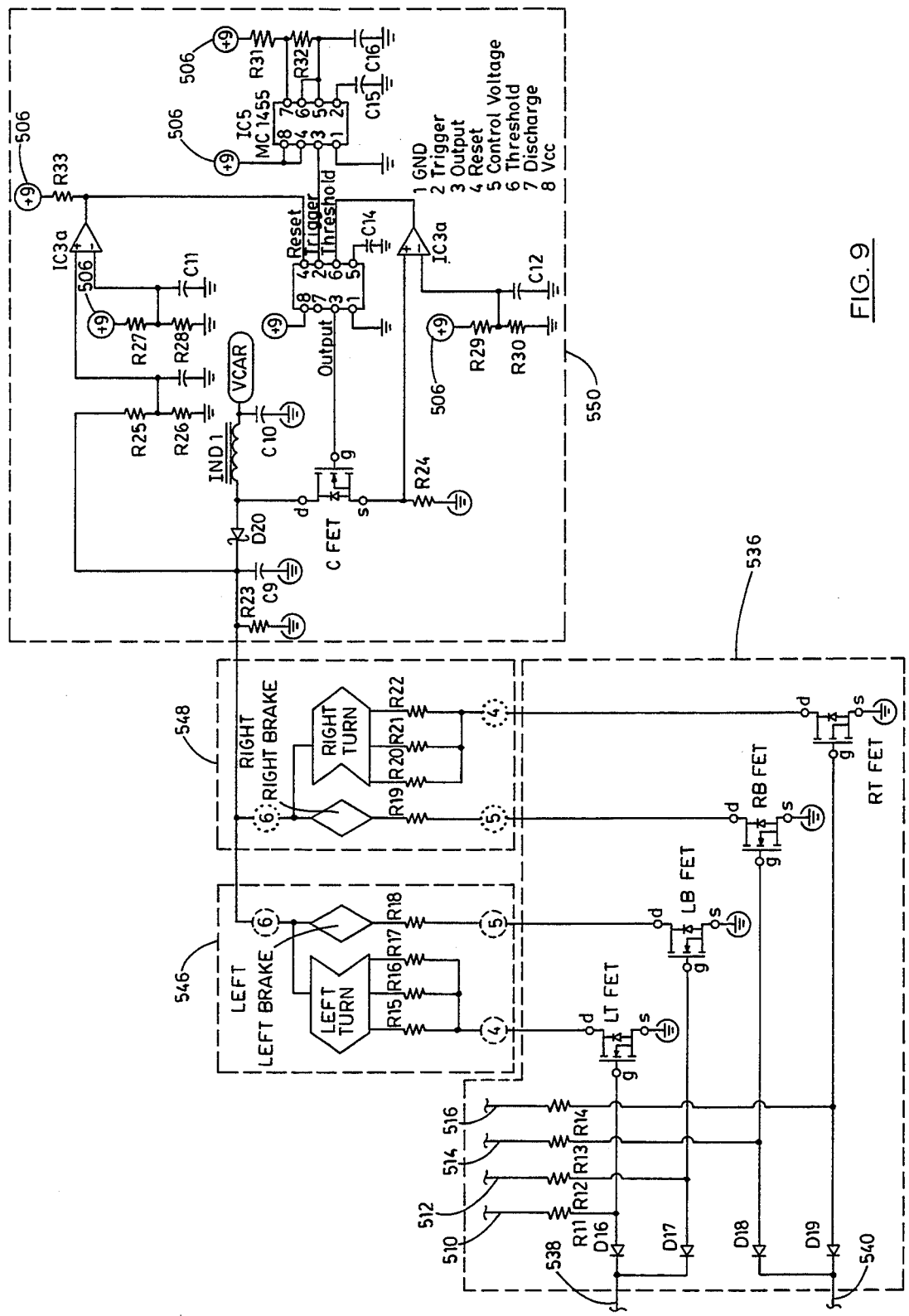

As best seen in FIG. 9, the boxes which are designated by the numerals 546 and 548 represent the left and right brake, and turn arrays, respectively. Resistors R15, R16, R17, R18, R19, R20, R21, and R22, respectively, are each of the respective ballast resistors in a particular column of LEDs, a column being one of perhaps several parallel sets of individual LEDs connected in series within the array. Box 550 illustrates the LED power supply. In this regard, the LED power supply includes a 555 timer represented by the alphanumeric designator IC5 which develops a 100 kilohertz oscillator frequency used to start each step up voltage conversion. IC4 is a 555 timer used to trigger, stop (threshold), and reset the inductor charge cycle. During start-up of the device 10 the output voltage at capacitor C9 is at zero volts. This causes comparator IC3d to generate a logic high at the reset pin "4" of IC4, that is, (low, stop, or reset). When the reset is high and a trigger pulse is presented at IC4 pin "2," the output at pin "3" goes high, causing current to flow through inductor IND1, through CFET, and then through resistor R24. Additionally, as current increases, the voltage developed across resistor R24 also increases until it is greater than the voltage across capacitor C12. At this point, IC3c presents a logic high pulse to IC4 pin "6" (threshold) which, in turn, switches the output to a low state, causing inductor IND1 to discharge its stored charge through diode D20 to capacitor C9. If the voltage at capacitor C9 is below the reset level determined by comparator IC3d, the charge/discharge cycle repeats until the voltage at capacitor C9 is above the reset level, at which time a logic low to be established at IC4 pin "4" causes the charge/discharge cycle to terminate. When the display is illuminated, electric current will flow from capacitor C9, causing the voltage across capacitor C9 to decrease. Once the voltage has decreased below the reset threshold voltage, the IC4 reset pin "4" is restored to a logic high condition and the inductor IND1 begins to charge upon the receipt of the next trigger pulse. It is to be noted that the reset threshold voltage is scaled by resistors R27 and R28 for reference and resistors R25 and R26 for feedback. The equivalent voltage is 45 volts dc at capacitor C9.

Figure 11:
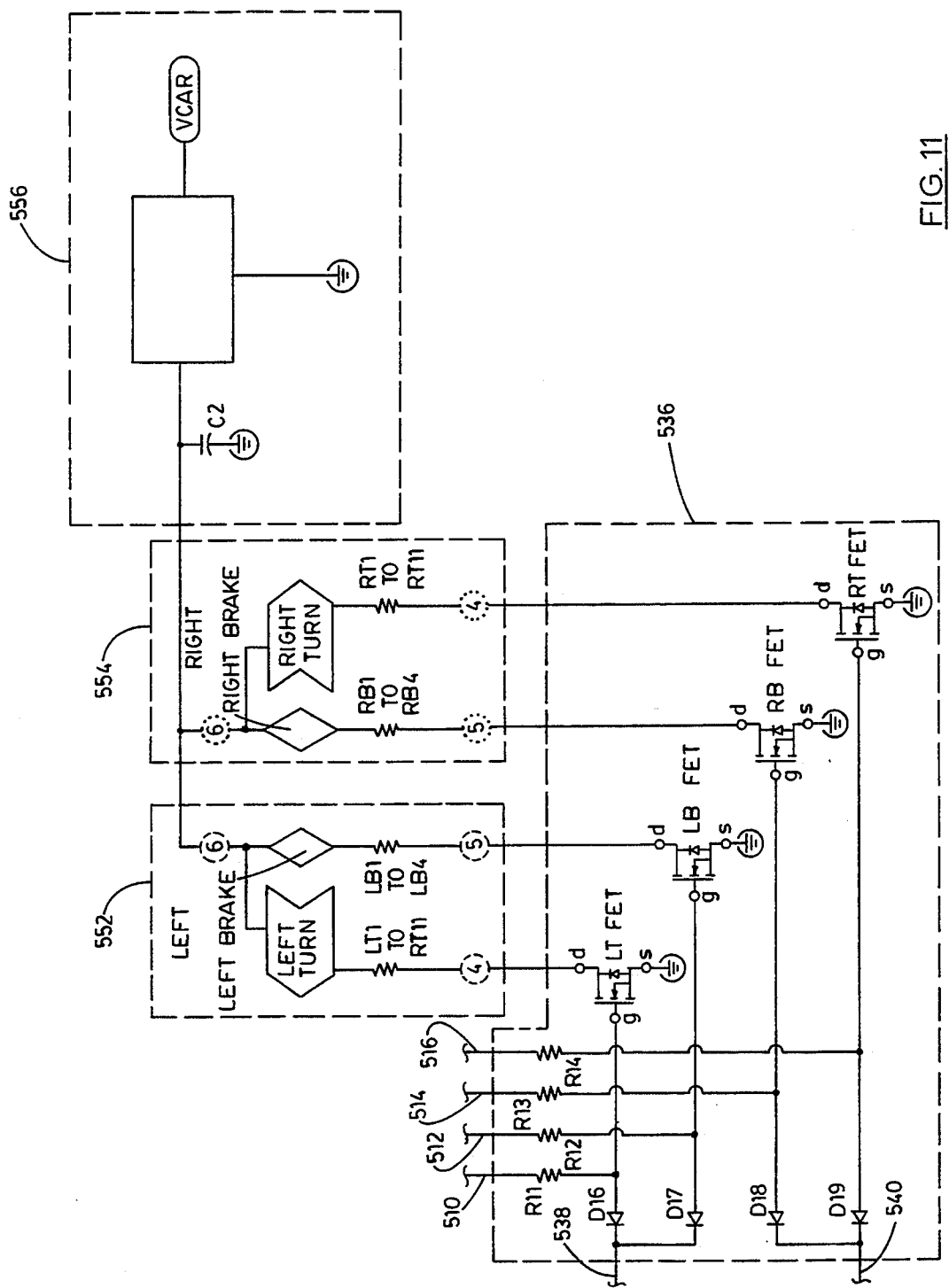

As should be understood, FIGS. 7, 8, 10, and 11 collectively represent a schematic of the circuitry which is employed to step down voltage and wherein three separate boards are employed. It is to be noted that the operation of the circuits shown in FIGS. 7, 8, and 10 apply to situations where voltage is stepped down as well as for situations where voltage is stepped up. As should be understood, FIG. 11 is, however, substituted in place of FIG. 9 for the case of stepped down voltage regulation; and boxes 552, 554, and 556 are substituted in place of boxes 546, 548, and 550, respectively. The LED power supply represented by the box labelled 556 is commercially available from Power Trends, Inc., of Illinois under the trade designation 79SR09 step down voltage regulator.

Figure 12:
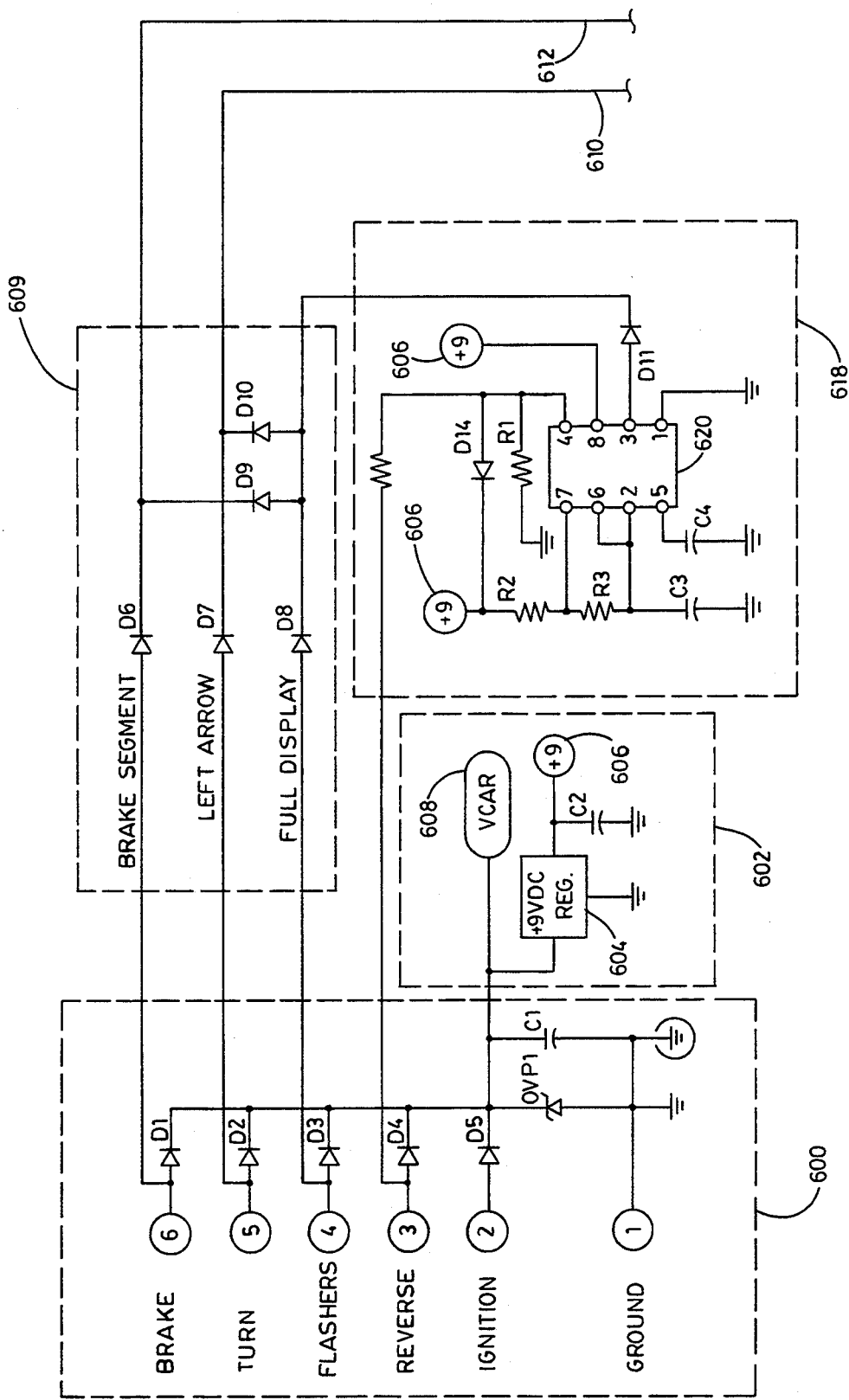
FIGS. 12, 13, and 14 collectively represent a third alternate schematic of circuitry which may be utilized with the present invention, and wherein voltage is stepped up. A single circuit board is employed in this form of the invention.
Figure 13:
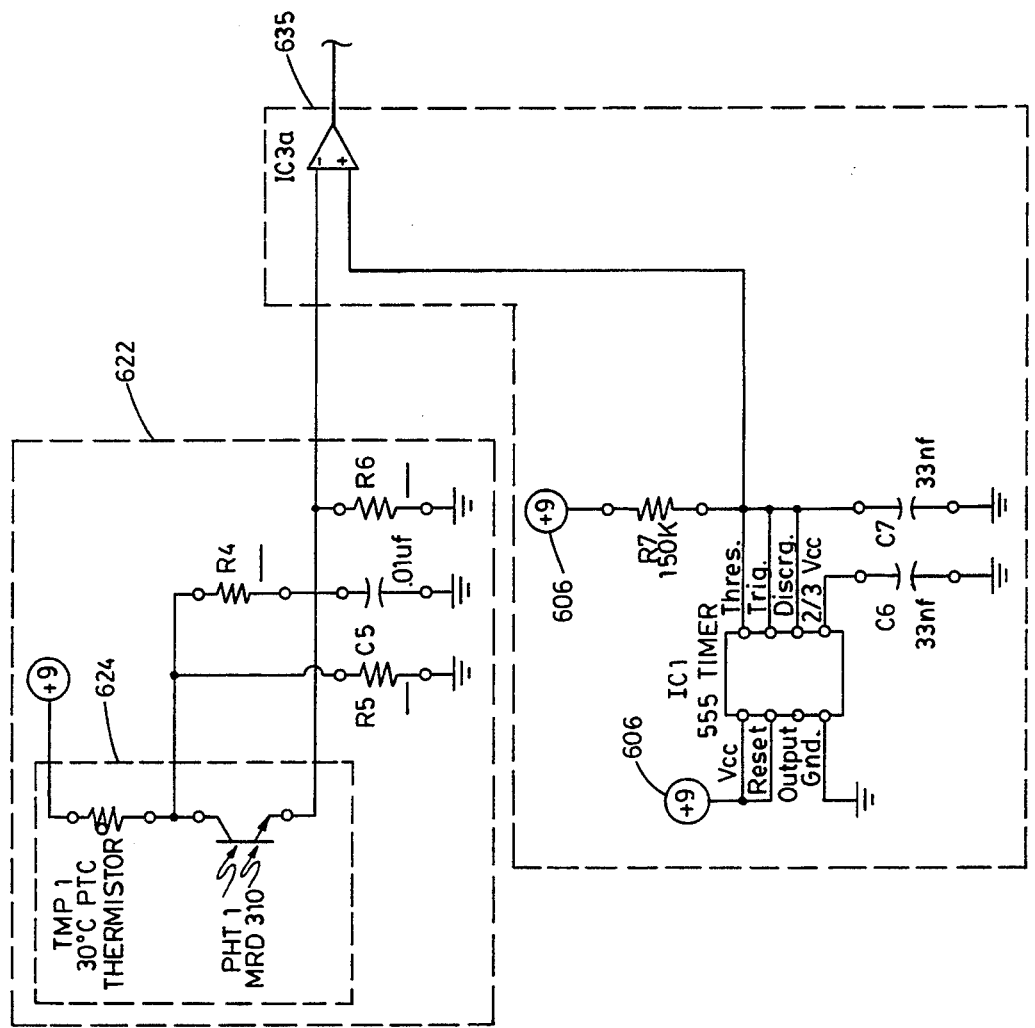
Figure 14:
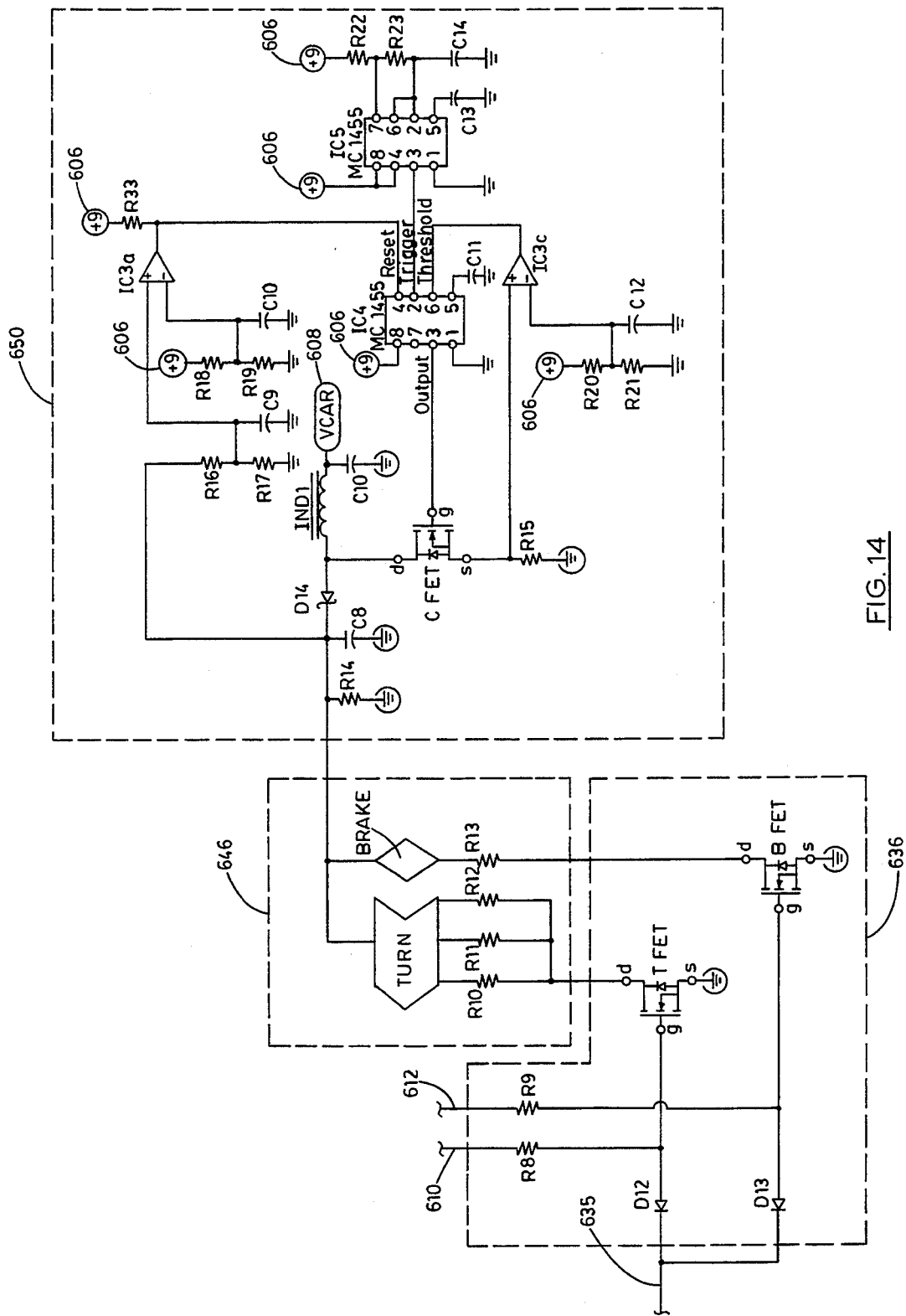

FIGS. 12, 13, and 14 collectively represent a schematic view of circuitry wherein voltage is stepped up and a single board is employed. In particular, and referring to FIG. 12, at the box designated by numeral 600, input reverse bias protection and overvoltage protection are provided. In this regard, power is provided to the circuit board at diode D1 (brake), diode D2 (turn), diode D3 (flashers), diode D4 (reverse), and diode D5 (ignition) while simultaneously providing reverse or negative protection. OVP1 provides overvoltage protection while capacitor C1 provides filtration. At the box designated as 602, a 9 volt dc power supply is shown. Voltage from diodes D1, D2, D3, D4, and D5, respectively, are routed to a linear 9 volt dc voltage regulator 604. The output of the regulator 604 is filtered by capacitor C2, which, in turn, is routed to the control electronics which are designated by the numeral 606. At numeral 608, a Vcar is illustrated and which is routed to the LED power supply, discussed below. The box labeled 609 represents the LED array control diode logic. Diodes D6 (brake segment), D7 (left arrow), D8 (full display), and diodes D9 and D10 provide steering logic along electrical conduits 610 and 612, respectively, to array control FETs, which are explained in greater detail below. The array control FETS enable or render operable the desired LED arrays for a particular input response. Box 618 represents the reverse strobe oscillator. Integrated chip 620 is a 555 type timer. The output of the timer is an 8 hertz 50% duty cycle pulse train. Diode D14 dumps voltage above 9 volts dc back into the 9 volt dc supply, thereby protecting the reset pin designated by the numeral "4." Resistors R2, R3, and capacitor C3 have predetermined operational values which are required by the $R^T C^T$ timing oscillations in order to create the required output pulse train. Resistor R1 pulls the reset pin "4" low, thus stopping the output pulse train whenever voltage is not applied to the reverse input pin which is designated as "3." Diode D11 blocks the voltage coming from the flashers pin "4," thus protecting the timer. If the timer is active, diode D11 is forward biased and provides voltage to the LED array control FETs along electrical conduits 610 and 612, which are explained in greater detail below.

FIG. 13 illustrates the ambient light and LED temperature feedback network. The circuitry represented by the boxes 622 and 624 is directly analogous to the circuitry represented by the boxes 522 and 524 and the description of such is not repeated herein for the sake of brevity. FIG. 10, which shows an alternate configuration for the ambient light and LED temperature feedback network, is also applicable here as was the case of the single board system.

Returning now to FIG. 13, a PWM (pulse width modulation) oscillator and level detector is represented by the box labeled 634. FETs and certain logic diodes are shown in box 636 of FIG. 13. The circuitry represented in the boxes 634 and 636 of FIG. 13 is directly analogous to the boxes 534 and 536 of FIG. 8 with the exception that there are two FETs (T FET and B FET) and one comparator (IC3a) instead of four FETs (LT FET, LB FET, RT FET, and RB FET). The reason for this difference is that a single board system controls one half of the number of LED arrays that a three board system does. The three board system will control the functioning of a mirror assembly 10 on both the driver and passenger sides, whereas a single board system will control the functioning of a mirror assembly 10 on only one side of the vehicle.

In FIG. 14, box 646 represents the left brake and turn arrays, respectively. Resistors R10, R11, R12, and R13 are each ballast resistors in a particular column of LEDs. At the box designated 650, the LED power supply is shown. The LED power supply includes a 555 timer represented by IC5 which develops a 100 kilohertz oscillator frequency used to start each step up voltage conversion. IC4 is a 555 timer used to trigger, stop (threshold), and reset the inductor charge cycle. During start up of the system the output voltage at capacitor C8 is at zero volts. This causes comparator IC3d to generate a logic high at the reset pin designated as number "4" of IC4 (low, stop, or reset). When the reset is high, and a trigger pulse is presented at IC4 pin "2," the output at pin "3" goes high, thereby causing current to flow through inductor IND1, through CFET, and then subsequently through resistor R24. As will be appreciated, as current increases, the voltage developed across resistor R15 also increases until it is greater than the voltage across capacitor C12. At this point, comparator IC3c presents a logic high pulse to IC4 pin "6" (threshold) which, in turn, switches the output to a low state, thereby causing inductor IND1 to discharge its stored charge through diode D14 to capacitor C8. If the voltage at capacitor C8 is below the reset level determined by comparator IC3d, the charge/discharge cycle repeats until the voltage at capacitor C8 is above the reset level, at which time a logic low to be established at IC4 pin "4" causes the charge/discharge cycle to terminate. When the display is illuminated, current will flow from capacitor C8, thereby causing the voltage across capacitor C8 to decrease. Once the voltage has decreased below the reset threshold voltage, the IC4 reset pin "4" is restored to a logic high condition and the inductor IND1 begins to charge upon the receipt of the next trigger pulse. It is to be noted that the reset threshold voltage is scaled by resistor R18 and R19 for reference, and resistors R16 and R17 provide feedback. The equivalent voltage is approximately 45 volts dc at capacitor C8.

Figure 15:
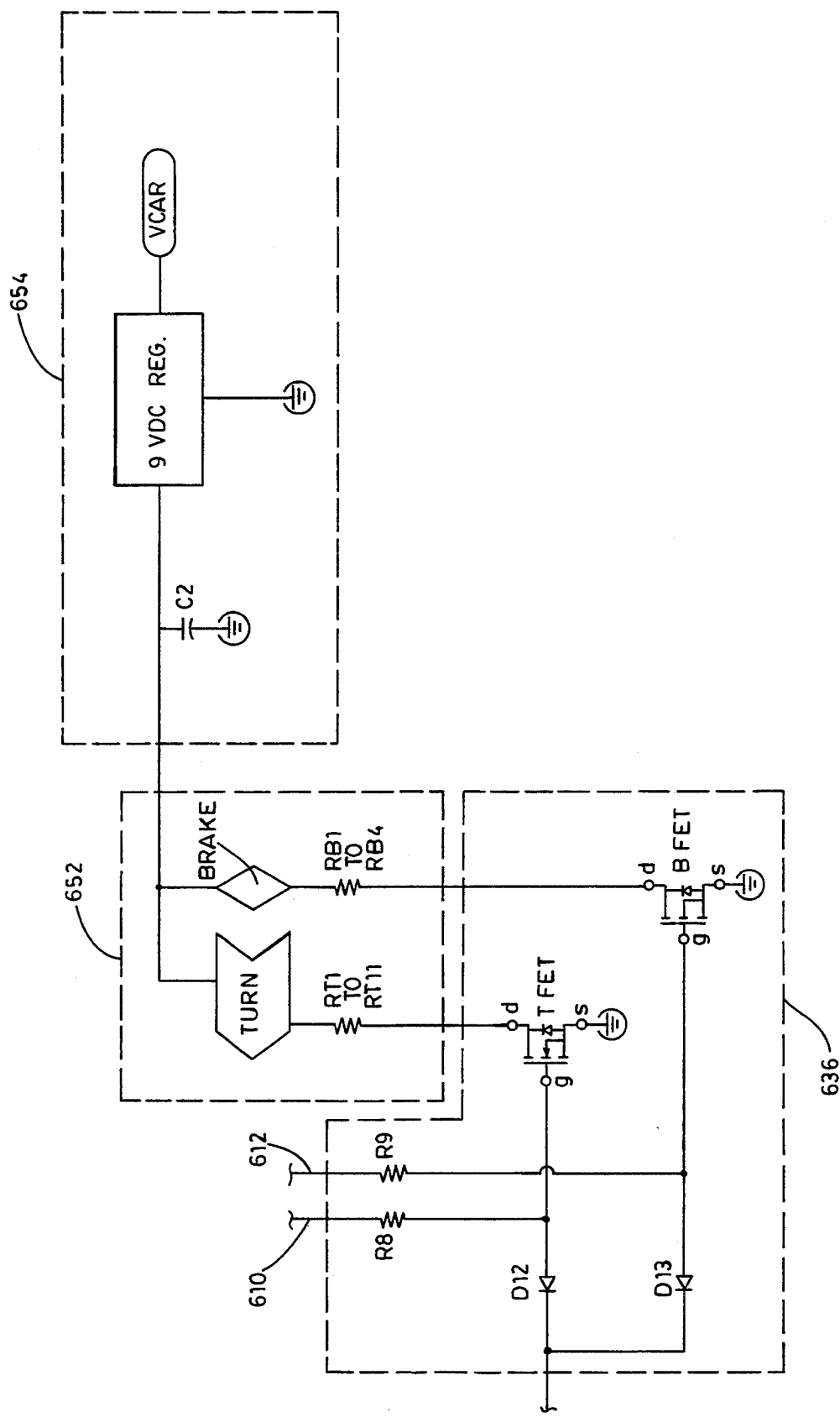

FIGS. 12, 13, and 15 collectively represent a schematic illustration of the circuitry wherein voltage is stepped down and a single board is employed. It is to be noted that the description for FIGS. 12 and 13 apply equally for the case of where voltage is stepped down as for the case where voltage is stepped up. FIG. 15 is, however, substituted for FIG. 14 in the situation where stepped down voltage regulation is desired, and boxes 652 and 654 are substituted for boxes 646 and 650. The LED power supply represented by the box 654 is commercially available from Power Trends, Inc., of Illinois, under the trade designation 79SR09 step down voltage regulator.

The mirror system 10 of the present invention could further be integrated with other well-known assemblies. An example of such integration would be the incorporation of a heater (not shown) to apply heat to the dichroic mirror 50. This is particularly advantageous where the mirror assembly 10 is a side view mirror which is positioned on the exterior of the vehicle 11. As will be appreciated, the exterior mounted, side view mirrors are susceptible to being occluded or obscured by snow, ice, or fog, thereby resulting in unsafe driving conditions. The use of a heater enables the driver 20 to switch the heater on and clear the mirror 50 from the convenience of the passenger compartment 14. Alternately, the heater may be switched on automatically when the vehicle is in operation. The heater may be of several different possible types. Unfortunately, the most commonly used mirror heaters would not be useful in the present invention in view of their inherent characteristics which would inhibit or prevent the passage of light through the dichroic mirror 50. Therefore, the heater employed must not impede or otherwise inhibit the passage of light, or otherwise must be employed in a fashion where it would not inhibit the passage of light. One variety may be the use of a filament based heater, such as a heater which is imbedded in an acrylic substrate and which may be applied to the surface which is heated, i.e. the dichroic mirror. This may be accomplished by a pressure sensitive adhesive. Another possible approach may be to use an opaque heater which is positioned on the second or rearwardly facing surface 72 of the dichroic mirror 50 in a selective manner such that the heater does not occlude the transmission path of the light source 70. Yet another possible heater arrangement would be to apply a clear conductive coating with high resistance to the dichroic mirror 50.

Another possible use of other prior art assemblies in combination with the mirror assembly 10 may be the use of an electrochemical, electrochromic, or liquid crystal cell which is used to automatically adjust the opacity of the dichroic mirror 50. It may be desirable to adjust the opacity of the dichroic mirror upon the striking of a high intensity headlight beam which is reflected into the eyes of the operator 30. The electrochemical cell (not shown) may be of either gel-type or solid slate. The opacity may then be altered by application of voltage to the cell. The greater the voltage applied, the greater the opacity provided by the cell. Upon sensing of a high intensity headlight beam, voltage may be introduced to the cell which in turn increases the opacity and thereby reduces the possibility of blinding of the operator 30. In such a situation, the light output of the mirror assembly 10 would be electronically adjusted to compensate for the decreased transmission efficiency of the dichroic mirror as the opacity is increased by the action of the electrochromic cell.

OPERATION

The operation of the described embodiments of the present invention are believed to be readily and are briefly summarized at this point.

In the operation of the mirror assembly 10, a desired warning signal, that is, braking, turn signal, reverse (strobe), or flasher, is induced in the LED 76 array by the actions of the operator 30. For example, the brake pedal 25 may be depressed, which lights the entire array of LEDs 76 (FIG. 1A). Further, and upon operation of the hand operated signaling switch 27, a subset of the array of LEDs 76 is lighted in a flashing manner to provide a visual signal to other drivers in the vicinity that the vehicle 11 may change directions, turn, change lanes, or the like (FIG. 1B or 1C). Upon operation of the hazard signal, the entire array of LEDs 76 is lighted in a flashing manner. For the case of a shifting into reverse, the array of LEDs may be lighted in a strobe or rapidly intermittent fashion.

When the LED array 76 is lighted, the light emanating therefrom is directed forward relative to the mirror assembly 10 and collimated by the reflectors 60 and the array of convexo-convex lenses 58. The collimated light is then bent by the first and second fresnel prism sheets 54 and 56, and selectively directed along a desired transmission path by the baffle assembly 52. The dichroic mirror 50 then preferentially passes the wavelengths corresponding with the spectral band selected. The light emanating from the LED's is invisible to the operator 30 because of the action of the baffle assembly 52. To the operator 30, the mirror assembly 10 continues to operate as a standard side view mirror.

The circuitry described herein is operable to adjust the intensity of the light emanating from the LED array 76 according to environmental conditions of heat and intensity of the ambient lighting conditions. As earlier discussed, and since the performance of LEDs may be adversely affected by heat, and because LEDs in a closely compacted area under continuous and extended use may produce excessive heat, a condition may be introduced whereby the LEDs 76 are damaged due to exposure to heat. Where the LED array 76 is on continuously and for extended periods of time, as for example, when the overland vehicle 11 is stopped in a traffic jam, or at a railroad crossing, the circuitry will reduce the intensity of the LEDs to prevent overheating. It should be noted that conditions which cause the LEDs to be used continuously and for extended periods, and which cause the subsequent reduction in the intensity of the LEDs, do not create a hazard inasmuch as the most important time to communicate a warning signal appears to be at the initiation of the signal, as, for example, upon first signaling others that braking is occurring and where instantaneous reaction by an adjourning operator is required. The present invention actively derates or degrades the drive level of the LEDs down under conditions of excessive heat detected by the thermistor 81 which might otherwise cause failure in the LEDs due to the exposure of the LED's to excessive heat.

The circuitry of the mirror assembly 10 also senses the ambient light level and adjusts the light level emanating from the LEDs 76. Where there is only one brightness level for signaling devices, which is typically set to be sufficiently bright under daytime conditions, the light emanating from such signaling devices under darkened or nighttime conditions may be excessive and distracting to other drivers. Further, as applied to the mirror assembly 10, a side glow may be perceptible to the driver under such darkened conditions and may be distracting to the driver 30. By use of the photoelectric sensor 83, the LEDs may be dimmed under darkened conditions without compromising the performance of the mirror assembly 10 as the light output remains entirely adequate to warn or signal others in the vicinity of the overland vehicle 11 in such dark ambient conditions as would prevail when such dimming occurs.

It is to be understood that although the mirror assembly 10 of the present invention has been characterized as a side view mirror in an automobile 11, it may be applicable to other uses as well. It should be apparent that the present invention may, for example, be incorporated into other rearview mirrors for other overland vehicles, such as tractor-trailer, heavy truck and even motorcycles. The present invention may also be applicable to other non-vehicular applications, such as point of purchase display, signs, etc.

It is to be understood that the invention is not restricted to the specific optics or circuitry herein depicted, as there may be equivalent optics or circuitry which may carry out the same functions. For example, holographic optic elements may be substituted for the conventional optic elements herein depicted. It is yet further to be understood that the invention is not confined to the particular construction and arrangement of parts herein illustrated and described, but embraces all such modified forms as come within the scope of the following claims.

Having described our invention, what we claim as new and desire to secure by Letters Patent is:

1. A mirror assembly comprising:
   (a) a dichroic mirror having a first, forwardly facing surface and a second, rearwardly facing surface, the dichroic mirror allowing a predetermined narrow spectral band of light to pass from the second surface through the first surface, and reflecting a broad spectral band of visible light which strikes the first surface and which originates from a location forward of the first surface;
   (b) a light source positioned rearwardly of the second surface and emitting light in the predetermined narrow spectral band of light passed by the dichroic mirror; and
   (c) an electrical circuit for adjusting the light output of the light source in response to the ambient light level.

2. A mirror assembly as claimed in claim 1, and wherein the light source is an array of light-emitting diodes, and wherein the mirror assembly further includes an electrical circuit for adjusting the light output of the light-emitting diodes in response to the ambient light level.

3. A mirror assembly as claimed in claim 2, and wherein the mirror assembly further comprises:
   (a) a plurality of reflectors positioned intermediate the light-emitting diodes and the dichroic mirror, each reflector disposed in light reflecting relation relative to the individual light-emitting diodes in the array of light-emitting diodes, the reflectors directing light in a direction substantially forward of the mirror assembly;
   (b) an array of convexo-convex lenses positioned intermediate the reflectors and the dichroic mirror, each of the lenses disposed in substantial registry with the individual reflectors, the convexo-convex lenses collimating the light in a direction substantially forward of the mirror assembly;
   (c) a baffle assembly positioned intermediate the convexo-convex lenses and the dichroic mirror, and which permits the light emitted by the light-emitting diodes to travel along a selected transmission path, and wherein the reflection of the broad spectral band of visible light may be viewed in the dichroic mirror outside of the selected transmission path, and wherein the light emitted by the light source is not readily visible outside the selected transmission path; and
   (d) a fresnel prism sheet positioned intermediate the convexo-convex lens and the baffle assembly, and wherein the fresnel prism sheet shifts the direction of the light substantially along the selected transmission path.

4. A mirror assembly as claimed in claim 1, and wherein the mirror assembly is supplied with a fluctuating voltage, and wherein the mirror assembly further includes an electronic circuit for stepping the voltage up to a constant level for energizing the light source.

5. A mirror assembly as claimed in claim 1, and wherein the mirror assembly is supplied with a fluctuating voltage, and wherein the mirror assembly further includes an electric circuit for stepping the voltage down to a constant level for energizing the light source.

6. A mirror assembly as claimed in claim 1, and wherein the dichroic mirror further includes a means for adjusting the opacity of the dichroic mirror in response to the ambient light level.

7. A mirror assembly comprising:
   (a) a dichroic mirror having a first, forward facing surface and a second, rearward facing surface, the dichroic mirror allowing a predetermined narrow spectral band of light to pass from the second surface through the first surface, and wherein the dichroic mirror reflects a broad spectral band of visible light which strikes the first surface and which originates from a direction forward of the first surface;
   (b) a light source positioned rearwardly of the second surface and emitting light in the predetermined narrow spectral band of light passed by the dichroic mirror; and
   (c) means for adjusting the light output of the light source in response to the ambient temperature and the heat generated by the light source.

8. The mirror assembly of claim 7 wherein the light source is an array of light-emitting diodes and the mirror assembly further comprises:
   (a) a plurality of reflectors positioned intermediate the light-emitting diodes and the dichroic mirror, each reflector disposed in individually light reflecting relation relative to a light-emitting diode in the array of light-emitting diodes, the reflectors directing light in a direction substantially forward of the mirror assembly;
   (b) an array of convexo-convex lenses positioned intermediate the reflectors and the dichroic mirror, each of the lenses substantially aligned relative to a reflector, the convexo-convex lenses collimating the light in a direction substantially forward of the mirror assembly;
   (c) a baffle assembly positioned intermediate the convexo-convex lenses and the dichroic mirror, and which permits the light emitted by the light-emitting diodes to travel along a selected transmission path, and wherein the reflection of the broad spectral band of visible light may be viewed in the dichroic mirror outside of the selected transmission path, and wherein the light emitted by the light source is not readily visible outside the selected transmission path; and
   (d) a fresnel prism sheet positioned intermediate the convexo-convex lens and the baffle assembly, and wherein the fresnel prism sheet shifts the direction of the light substantially along the selected transmission path.

9. A mirror assembly as claimed in claim 7, and wherein the mirror assembly is supplied with a fluctuating voltage, and wherein the mirror assembly further includes an electronic circuit for stepping the voltage up to a constant level for energizing the light source.

10. A mirror assembly as claimed in claim 7 and wherein the mirror assembly is supplied with a fluctuating voltage, and wherein the mirror assembly further includes an electronic circuit for stepping the voltage down to a constant level for energizing the light source.

11. A mirror assembly as claimed in claim 7, and wherein the dichroic mirror further includes a means for adjusting the opacity of the dichroic mirror in response to the ambient light level.

12. A mirror assembly comprising:
(a) a dichroic mirror having a first, forwardly facing surface, and a second rearwardly facing surface, and wherein the dichroic mirror allows a predetermined narrow spectral band of light to pass from the rearward facing surface through the forward facing surface, and when the dichroic mirror reflects a broad spectral band of visible light which originates from a direction forward of the forwardly facing surface;
(b) an array of light-emitting diodes positioned rearwardly of the second surface and emitting light in the predetermined narrow band of light passed by the dichroic mirror;
(c) a plurality of reflectors positioned intermediate the light-emitting diodes and the dichroic mirror, each reflector disposed in substantially light reflecting relation relative to individual light-emitting diodes in the array of light-emitting diodes, the reflectors directing light in a direction substantially forward of the mirror assembly;
(d) an array of convexo-convex lenses positioned intermediate the reflectors and the dichroic mirror, each of the lenses disposed in substantial registry with each of the respective reflectors, the convexo-convex lenses collimating the light in a direction substantially forward of the mirror assembly;
(e) a baffle assembly positioned intermediate the convexo-convex lenses and the dichroic mirror, and which permits the light emitted by the light-emitting diodes to travel along a selected transmission path, and wherein the reflection of the broad spectral band of visible light may be viewed in the dichroic mirror outside of the selected transmission path, and wherein the light emitted by the light source is not readily visible outside the selected transmission path; and
(f) a fresnel prism sheet positioned intermediate the convexo-convex lens and the baffle assembly, and wherein the fresnel prism sheet shifts the direction of the light along the selected transmission path.

13. A mirror assembly as claimed in claim 12, and wherein the mirror assembly is supplied with a fluctuating voltage, and wherein the mirror assembly further includes an electronic circuit for stepping the voltage up to a constant level for energizing the light source.

14. A mirror assembly as claimed in claim 12, and wherein the mirror assembly is supplied with a fluctuating voltage, and wherein the mirror assembly further includes an electronic circuit for stepping the voltage down to a constant level for energizing the light source.

15. A mirror assembly as claimed in claim 12, and wherein the dichroic mirror further includes a means for adjusting the opacity of the dichroic mirror in response to the ambient light level.

16. A mirror assembly comprising:
(a) a dichroic mirror having a forwardly facing first surface and a rearwardly facing second surface, the dichroic mirror allowing a predetermined narrow spectral band of light to pass from the rearwardly facing surface through the forwardly facing surface, and wherein the dichroic mirror reflects a broad spectral band of visible light which originates from a direction forwardly of the first surface; and
(b) a light source positioned rearwardly of the second surface and emitting light in the predetermined narrow spectral band of light passed by the dichroic mirror, and wherein the mirror assembly is supplied with a fluctuating voltage, and wherein the mirror assembly further includes an electronic circuit for stepping the voltage up to a constant level for energizing the light source.

17. A mirror assembly as claimed in claim 16, and wherein the dichroic mirror further includes a means for adjusting the opacity of the dichroic mirror in response to the ambient light level.

18. A mirror assembly comprising:
(a) a dichroic mirror having a forwardly facing first surface and a second, rearwardly facing surface, and wherein the dichroic mirror allows a predetermined narrow spectral band of light to pass from the rearwardly facing surface through the forwardly facing surface, and wherein the dichroic mirror reflects a broad spectral band of visible light which originates from a direction forwardly of the first surface; and
(b) a light source positioned rearwardly of the second surface, and emitting light in the predetermined narrow spectral band of light passed by the dichroic mirror, and wherein the mirror assembly is supplied with a fluctuating voltage, and wherein the mirror assembly further includes an electronic circuit for stepping the voltage down to a constant level for energizing the light source.

19. A mirror assembly as claimed in claim 18, and wherein the dichroic mirror further includes a means for adjusting the opacity of the dichroic mirror in response to the ambient light level.

20. A mirror assembly comprising:
(a) a dichroic mirror having a forwardly facing first surface and a rearwardly facing second surface, and wherein the dichroic mirror allows a predetermined narrow spectral band of light to pass from the rearwardly facing surface through the forwardly facing surface, and wherein the dichroic mirror reflects a broad spectral band of visible light which originates from a direction forward of the first surface; and
(b) a light source positioned rearwardly of the second surface and emitting light in the predetermined narrow spectral band of light passed by the dichroic mirror, and wherein the mirror assembly is supplied with a fluctuating voltage, and wherein the mirror assembly further includes a means for stepping the voltage up to a constant level for energizing the light source, and wherein the dichroic mirror further includes a means for adjusting the opacity of the dichroic mirror in response to the ambient light level.

* * * * *